United States Patent
Andersen et al.

(12) 
(10) Patent No.: US 6,640,231 B1
(45) Date of Patent: Oct. 28, 2003

(54) ONTOLOGY FOR DATABASE DESIGN AND APPLICATION DEVELOPMENT

(75) Inventors: William A. Andersen, Baltimore, MD (US); Paul M. Brinkley, Columbia, MD (US); Joshua F. Engel, Laurel, MD (US); Brian J. Peterson, Hanover, MD (US)

(73) Assignee: Ontology Works, Inc., Odenton, MD (US)

(*) Notice: Subject to any disclaimer, the term of this patent is extended or adjusted under 35 U.S.C. 154(b) by 301 days.

(21) Appl. No.: 09/684,884

(22) Filed: Oct. 6, 2000

(51) Int. Cl.[7] ............................................. G06F 7/00
(52) U.S. Cl. ...................... 707/102; 707/104.1; 706/47
(58) Field of Search ............................... 707/100, 102, 707/104.1, 6; 706/45, 47

(56) References Cited

U.S. PATENT DOCUMENTS

| | | | | |
|---|---|---|---|---|
| 5,418,943 A | * | 5/1995 | Borgida et al. ................. 707/4 |
| 5,551,029 A | * | 8/1996 | Jagadish et al. ........ 707/103 R |
| 5,627,979 A | * | 5/1997 | Chang et al. ............ 707/104.1 |
| 5,758,152 A | * | 5/1998 | LeTourneau ................ 707/102 |
| 5,809,297 A | * | 9/1998 | Kroenke et al. ............ 707/102 |
| 5,809,492 A | * | 9/1998 | Murray et al. ................ 706/45 |
| 5,873,088 A | * | 2/1999 | Hayashi et al. ............. 707/100 |
| 5,970,490 A | * | 10/1999 | Morgenstern ................ 707/10 |
| 6,016,394 A | * | 1/2000 | Walker ........................ 717/104 |
| 6,163,781 A | * | 12/2000 | Wess, Jr. .................... 707/100 |
| 6,171,109 B1 | * | 1/2001 | Ohsuga ........................ 706/27 |
| 6,236,994 B1 | * | 5/2001 | Swartz et al. ............... 707/101 |
| 6,243,709 B1 | * | 6/2001 | Tung ............................. 707/1 |
| 6,247,002 B1 | * | 6/2001 | Steels .......................... 706/20 |
| 6,263,341 B1 | * | 7/2001 | Smiley ....................... 707/102 |
| 6,279,008 B1 | * | 8/2001 | Tung Ng et al. .......... 707/102 |
| 6,289,338 B1 | * | 9/2001 | Stoffel et al. .................. 707/3 |
| 6,298,354 B1 | * | 10/2001 | Saulpaugh et al. .......... 707/100 |
| 6,311,194 B1 | * | 10/2001 | Sheth et al. ................. 707/505 |
| 6,314,555 B1 | * | 11/2001 | Ndumu et al. ............... 717/101 |
| 6,424,973 B1 | * | 7/2002 | Baclawski .................... 707/102 |
| 6,438,591 B1 | * | 8/2002 | Fehskens et al. ............ 709/102 |
| 6,446,060 B1 | * | 9/2002 | Bergman et al. ......... 707/104.1 |
| 2003/0005412 A1 | * | 1/2003 | Eanes ........................ 717/120 |

OTHER PUBLICATIONS

Gelder et al. The Well-Founded Semantics for General Logic Programming, ACM, 1991.*

(List continued on next page.)

*Primary Examiner*—Kim Vu
*Assistant Examiner*—Monplaisir Hamilton
(74) *Attorney, Agent, or Firm*—McGuireWoods LLP

(57) ABSTRACT

A system and method lets a user create or import ontologies and create databases and related application software. These databases can be specially tuned to suit a particular need, and each comes with the same error-detection rules to keep the data clean. Such databases may be searched based on meaning, rather than on words-that-begin-with-something. And multiple databases, if generated from the same basic ontology can communicate with each other without any additional effort. Ontology management and generation tools enable enterprises to create databases that use ontologies to improve data integration, maintainability, quality, and flexibility. Only the relevant aspects of the ontology are targeted, extracting out a sub-model that has the power of the full ontology restricted to objects of interest for the application domain. To increase performance and add desired database characteristics, this sub-model is translated into a database system. Java-based object-oriented and relational application program interfaces (APIs) are then generated from this translation, providing application developers with an API that exactly reflects the entity types and relations (classes and methods) that are represented by the database. This generation approach essentially turns the ontology into a set of integrated and efficient databases.

27 Claims, 20 Drawing Sheets

OTHER PUBLICATIONS

Han et al. Logic Base: A Deductive Database System Prototype, ACM, 1994.*

Storey et al. Databse Design with Commmom Sense Business Reasoning and Learning.*

Arpirez et al. WebODE: a Scalable Workbench for Ontological Engineering.*

Grant John, Minker Jack, The Impact of Logic Programming on Databases, 3–92, ACM.*

Harrison John, Active Rules in Deductive Databases, 11–93, ACM.*

Sagonas et al, An Abstract Machine for Computing the Well Founded Semantics, Journal of Logic Programming, 45(1–3), pp. 1–41, Sep. 2000.*

Lenat et a CYC: Toward Programs with Common Sense, ACM, 1999I.*

Swartout et al. Toward Distributed Use of Large0Scale Ontologies ksi.cspc.ucalgary.ca/KAW/KAW96/swartout/Banff_96_final_2.html 1996.*

Advanced Database Systems. Carlo Zaniolo, Stefano Ceri, Christos Faloutsos, Richard T. Snodgrass, V. S. Subrahmanian, and Robert Zicari. San Francisco, CA:Morgan Kaufmann Publishers; 1997 Section 9.5.*

Swift et al, Analysis of Sequentiial SLG Evaluation, Symposium oon Logic Programming 1994.*

Wand et al. An Ontological Analysis of the Realationship Construct in Conceptual Modeling, 1999 pp. 494–528.*

B. Petersen et al., "Knowledge Bus: Generating Application-focused Databases from Large Ontologies", Proceedings of the 5th KRDB Workshop, May 1998.

* cited by examiner

ONTOLOGY FOR DATABASE DESIGN AND APPLICATION DEVELOPMENT

BACKGROUND OF THE INVENTION

1. Field of the Invention

The present invention generally relates to database systems and, more particularly, to a process for creating and maintaining ontologies and processes for semi-automatically generating deductive databases, especially for biological information systems.

2. Background Description

Database engineering practices and technologies of the last two decades have proven a poor match for the complex information handling and integration needs of modern enterprises. These techniques and technologies center on the construction of databases which are manually designed by a team of developers. This not only includes the database code itself (schemas, views, and integrity constraints) but also includes the peripheral software needed to run such a system: data loaders or "cleaners", application software, and other computer resources.

For very simple or highly standardized domains, this approach is sufficient. Simple domains require a simple database schema and few integrity constraints on the data. Such domains change very slowly over time, making it easy for developers to keep up with the design requirements. However, many problems faced by modern database customers don't fit these criteria. For instance, systems involving any sort of analytic component typically require extremely complex and fluctuating rules reflecting real-world situations. Using current techniques, the process of keeping such information systems current is error-prone and prohibitively expensive, costing millions of dollars in developer salaries alone over the system life cycle.

Moreover, current systems have a fundamental and more severe problem: integrating data from any two systems requires custom-made middleware, because it is impossible for the system to "understand" the content of the participating databases well enough to perform the required integration automatically. The use of a shared ontology to enable semantic interoperability of existing databases and other software is gaining acceptance. It is possible to enable communications between two systems by mapping the semantics of independently developed components to concepts in an ontology. In the computer sciences, an "ontology" refers to a conceptual model describing the things in some application domain (e.g., chemistry) encoded in a formal, mathematical language.

In the context of the invention, an ontology is a formal (concretely specified) description of a business domain. It contains a taxonomy of concepts ("a person is a type of mammal"; "a corporation is a type of legal entity"), and also contains a set of rules relating those concepts to each other ("flight numbers are unique within airlines over time"). Data element standards and metadata repositories and their associated tools formalize some (but not all) system behavior, leaving the rest to be specified in free-form English text which cannot be "understood" automatically. Ontologies, on the other hand, represent these concepts and rules in a completely formal language; their meanings are meant to be accessible to the computer. Unfortunately, ontologies are specified using languages which are far too powerful to allow their being used in a straightforward manner to build practical information systems, until development of the present technology.

Generating application-focused databases from large ontologies is described by Brian J. Peterson, William A. Anderson and Joshua Engel in *Knowledge Bus: Generating Application-focused Databases from Large Ontologies*, Proceedings of the 5th KRDB Workshop, May 1998 (hereinafter, Peterson et al.) and herein incorporated by reference in its entirety. In their paper, Peterson et al. propose to generate the databases (including application program interfaces (APIs)) directly from focused subsets of a large, general purpose ontology. By extracting only a subset of the ontology needed to support representation and reasoning in a focused application domain, the resulting systems are smaller, more efficient and manageable than if the entire ontology were present in each system.

SUMMARY OF THE INVENTION

The subject invention builds on the work of Peterson et al. According to the invention, there is provided a process for creating and maintaining ontologies and a process for semi-automatically generating deductive databases (DDBs). The ontology is a Ontology Works language (OWL) ontology managed by the Ontology Management System (OMS). An OMS ontology has a hierarchy of categories, which denote classes of objects (note that this is different from the object-oriented notion of class). This hierarchy is partitioned by the type and attribute hierarchies. The type hierarchy includes the categories that can participate in predicate signatures, and corresponds to symbols that become types within a generated database. The OMS ontology consists of a set of OWL sentences, each of which has an associated conjunctive normal form (CNF) version. The deductive database generator (DDBG) applies a series of conversion and review steps on the CNF of the OWL sentences within the input ontology. It generates a pre-DDB, which defines the schema of the deductive database, as well as provides the rules required for reasoning the integrity-constraint checks. A Strongly-Typed API Generator (STAG) takes the pre-DDB and generates a Java-based API for the resulting DDB. This API is a strongly typed, object-oriented view of the elements defined in the pre-DDB. The DDB consists of a pre-DDB with a Java server and a backing store.

The following sections describe the process used to generate databases:

Extraction

The extraction phase starts with those entities and relationships immediately relevant to the problem at hand, and identifies those parts of the ontology necessary to support them. For example, a dinosaur taxonomy is not relevant to a database supporting financial analysis of automobile exports, but concepts relating to products and international economics are. The set of immediately relevant concepts may be already present in the ontology, entered by hand by the database designer, or automatically derived from existing database schemas.

Translation

The translator builds a database whose schema implements the structure given by the extracted portions of the ontology. In addition, it generates view and constraint definitions which implement the semantics of concepts in the ontology with perfect fidelity and high efficiency. The user can guide the translator to omit some details for improved performance.

Java Object Oriented (OO)/Relational API

The database is exposed through a Java API. The API provides a simple object-oriented view of the ontology which will be familiar to all Java programmers. The API also provides a relation-based view for more sophisticated queries. Both enforce strong typing rules, which improves program correctness, makes programs easier to reuse, and speeds program development.

XSB-based Deductive Database

A deductive database (DDB) is about as close as databases are ever likely to get to ontologies, and translating from (part of) an ontology to a DDB requires, in general, the least loss of information. This is why it was decided to develop a translator for a DDB first, before a relational or object-oriented data model. The core of the deductive database is XSB, a main memory deductive database system developed at the State University of New York, Stony Brook. XSB itself lacks many features found in traditional database systems. To compensate for this, OW provides a database server built on XSB which provides transaction and recovery services, while taking advantage of the query processing efficiency of the DDB.

The system and method of the present invention include various improvements and variations over the system described by Peterson et al. In particular, the system according to the invention has both conceptual and implementation improvements over the Peterson et al. system including, but not limited to, those improvements described below.

Conceptual Improvements

Conceptual improvements were made to the ontology used in the processes of the present invention, as well as in the databases and APIs generated:

1. Specialized Ontology

The present invention uses a specialized ontology in its generation processes. The Ontology Management System (OMS) ontology has the expressive power of a general purpose ontology, but has mechanisms and methodologies oriented towards using the ontology for the automatic generation of databases.

Using such a specialized ontology makes the translation processes simpler, more maintainable, more reliable, and results in better, more efficient databases (both deductive and non-deductive databases).

2. Uses Well-Founded Semantics (WFS) for the Ontology

The WFS was developed as a natural declarative semantics for general logic programs (those that allow for negated subgoals). Its use as an ontological semantics is novel and has many advantages. Because WFS has a very intuitive interpretation for negation and recursion (unlike classical semantics, even with non-monotonic extensions), it is much easier to use and to reason over. A considerable simplification is that a non-monotonic extension is not necessarily since WFS is equivalent to the major non-monotonic formalisms like Belief Logic and Circumscription. WFS is a very good semantics to use for deductive databases. Using WFS for the ontology that generates such databases makes the translation process much more effective and efficient. There is much less difference between the generated database and the originating specification (the ontology).

3. Specialized Type Hierarchy

The OMS restricts its notion of a type from the notion used in other general purpose ontologies (like Cyc): A type is a property that holds for an object for all time, i.e. a necessary property versus a contingent one. This distinction allows for a better correlation between the types in a generated database and the types in the originating ontological specification.

The set of types associated with objects in object-oriented databases and programming languages are usually static, meaning that an object does not lose nor gain types. Also, method signatures consist entirely of these types. The OMS has a similar notion of type and (flnctor) signatures, and so there is a much better correlation between the specification (the ontology) and the generated database.

4. Unary Type-checking Predicates

Unlike ontological systems like Cyc, the OMS in accordance with the present invention adds a unary predicate for each declared type that is used to check for that type. In the OMS there are two ways to check if the symbol b has the type person:

(isa b person)

(person b)

The first way, isa/2, is the same as in the Cyc system; the OMS allows for the second way as well, the person/1 predicate, in order to prevent locking bottlenecks in Generated databases. If isa/2 were the only way of checking for a type, then most predicates would depend on isa/2. When the rules are manifested in a databases, this dependency will result in most of the database being locked whenever a new symbol is added to the database (because this update requires asserting a type for the new symbol, which is a modification of the "isa" table).

In the OMS, the isa/2 predicate is used for type-checking only when the type being checked for is not statically known, and the unary predicates are used when the type is statically known. For example, the rule (=>(and (p ?X)(isa ?Y ?X)) (q ?Y))

uses isa/2 because the target type is only known at run-time and not at the time that the rule is added to the OMS.

5. Temporal/non-temporal Predicates

The OMS of the present invention differentiates between predicates that are time dependent and those that are not. This distinction allows the translator to programmatically restrict the application of the temporal-model in generated databases to those predicates that truly depend on it.

6. Dropped Dynamic Class Creation

The generated API (generated by the STAG) does not allow for dynamic class creation, making the API simpler, much more efficient, and easier to use.

7. Added Equality Reasoning

The OMS and KBDB's can now perform equality reasoning. This implements the intended behavior of the OWL '=' symbol. This allows users to assert equality facts and have the system use them when processing queries. For example, asserting that (=fred (fatherOf joe))

allows the system to correctly answer the question (likes ted fred)

if it knows that (likes ted (fatherof joe)).

The factual assertions retain their original information, so that if the equality information were later retracted, the original information is not lost.

Implementational Improvements

Along with the conceptual improvements, there are many significant implementational improvements in accordance with the present invention that make the generation processes more effective and the generated databases more efficient and more powerful.

1. VVFS Temporal Model

A WFS implementation of the temporal model was developed. This gives users the option of generating deductive databases with a non-stratified rule set.

2. Subgoal Reordering

A module for reordering subgoals was developed. This module can handle non-recursive rule sets as well as recursive ones. The addition of this module makes the generation processes reliable and repeatable, decreasing the time required to generate a usable database from weeks, as required by the system described in Peterson, et al., to hours. The resulting database is also more efficient since the entire rule set was optimized with respect to subgoal reordering (versus the sample-query approach taken in Prior System).

3. Rule Optimization

The modules that optimize recursive and non-recursive rule sets (in addition to the subgoal reordering) is a very significant improvement over the Peterson et al. system. These components result in much more efficient databases.

4. Function Symbols

The Peterson et al. system could not handle function symbols, whereas the system according to the present invention can.

5. Integrity Constraints 5.1 IC Module

The system according to the present invention adds an integrity constraint module to generated databases, whereas the Peterson et al. system had none what so ever.

5.2 IC Dependencies

Each integrity constraint (IC) will have a set of updates that it depends on, where if such an update occurs, then the IC needs to be checked. The dependent bindings can be propagated along the dependency graph when computing these update dependencies, which can be used to partially instantiate the IC calls required for that update.

6. Extensional Database (EDB) Rules

The system according to the present invention does not have to add the many extra binding-pattern analysis rules that the Peterson et al. system had to. Such analysis was pushed down to special rules that were added for each predicate that could have an asserted extent (one per extensional predicate). This reduced the factor of eight increase in the number of rules that the Prior system had to less than a factor of two (because not every predicate could have an asserted extent).

7. Uses DDB for OMS

The OMS is implemented as a KBDB deductive database application, using the KBDB for persistent storage and to perform inferences and integrity-constraint checks (these checks are over the OMS rules themselves as well as asserted facts). The OMS uses a variant of the DDBG to update the rule set. Using a KBDB for the OMS gives the OMS many characteristics of a database, such as transactional update. It also gives the OMS the efficiency of a KBDB, allowing it to be used in operational settings.

In a specific application, the invention has been used to construct a database for biochemical pathway information. This model included information ranging from the genome through transcription, translation to proteins, through the roles of those proteins in reactions and pathways. The database was populated with information on the chemical pathways from the bacterium *Mycoplasma pneumoniae* and exhibited unprecedented capabilities in supporting analysis and visualization applications.

Some examples of application domains for which the invention provides specific advantages include drug delivery, combinatorial chemistry and automated database curation. In the application domain of drug delivery, the biochemical pathway system can be enhanced to build complex human-guided and automated analysis tools for drug discovery. By providing detailed information on the function of pathways in terms of their genomic origins, spatial and chemical properties, programs can be used to automatically identify likely compounds for further analysis. In the application domain of combinatorial chemistry, the ability of ontological models to express complex chemical properties and incorporate results from the philosophy of chemistry can aid in the discovery and specification of powerful constraints that help predict the outcomes of complex reactions and aid in analysis of results. This capability will be particularly important when working with large molecules (the kind typically found in biochemistry) that exhibit emergent properties that are not obviously reducible to the basic properties of physical chemistry. In the application domain of automated database curation, unlike conventional database model, the ontology forms a logical basis for the curation of database entries. It can provide explanations for why conflicting entries actually conflict, and provide guidance to database curators to identify and correct sources of error.

Ontologies allow more complete understanding of chemical reactions because they facilitate integration of important contextual information into the representation of experimental results. For example, if one starts with a high-level ontology that includes a theory of topological relations (such as "inside", "outside", "connected", "contained in", "impermeable boundary", "semipermeable boundary", etc.), it becomes possible to represent the locations of chemicals within a cell and to express such as:

In most animal cells, sodium ions are present in higher concentration in the medium exterior to the cell than interior to the cell.

This ionic gradient across the membrane is maintained by a transport system whose components are located within the membrane.

This gradient can be maintained only if sufficient levels of ATP are present to drive the transport system.

The transport system is specifically inhibited by cardiotonic steroids; therefore, the gradient cannot be maintained if these steroids are co-located with the transport system components. In most databases, information such as this can only be represented as textual comments, which are difficult or impossible to interpret consistently and analyze automatically. By formalizing such contextual information as is usually found in comment fields (e.g., location of reaction within a cell, type of cell, tissue type, species, age, phenotype, temperature, protocol followed), much more automatic analysis and comparison of experimental results is possible.

Formalization of molecular structure can also lead to insights on function. Turning knowledge of a bimolecular sequence into a formal representation of that molecule's structure is a major challenge for bioinformatics, and is a precursor to achieving full understanding of molecular function in the context of complex organisms. Ontologies enable the formal representation of the structural and functional characteristics of molecules, leading to improved evaluation of molecules for target structures. For example, queries such as "Find all molecules with a predicted heme-binding region located on the interior of the protein's predicted shape, where the interior consists mostly of nonpolar residues" becomes possible.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
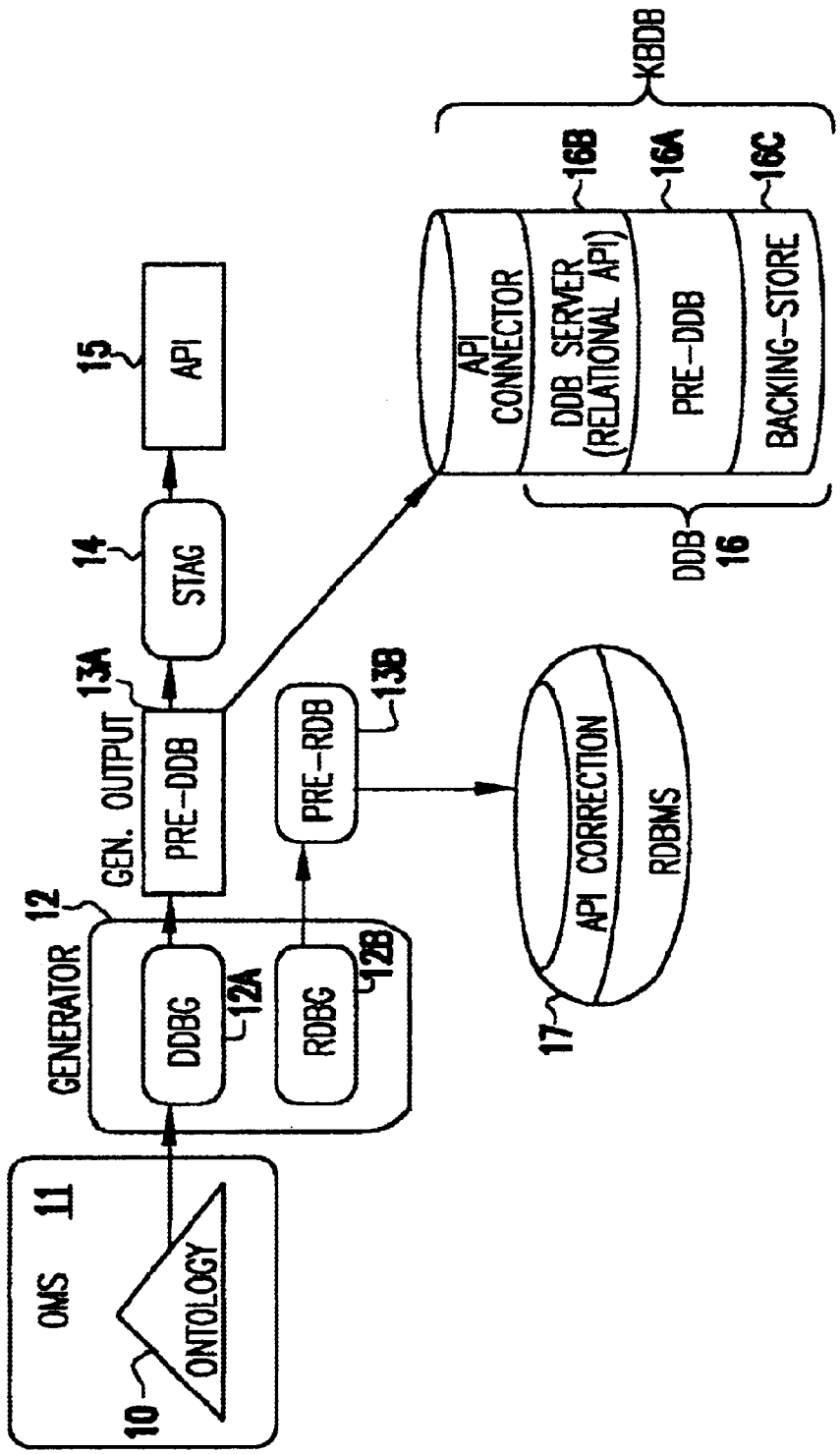
FIG. 1 is a block diagram of the database generation system according to the present invention.

In order to better understand the description that follows, a number of terms and concepts are herein defined.

Basic OWL Syntax

OWL is based on the Knowledge Interchange Format (KIF) language developed by the Stanford University Knowledge Systems Laboratory—reference the original Draft Proposed ANSI Standard (http://logic.standord.edu/kif/dpans.html) for a description of KIF.

The basic OWL expression is the literal, which has the following format:

(p c ?y)

This expression consists of a predicate, p, followed by a series of arguments. The argument c is a constant symbol and ? y is a variable. All variables, and only variables, have a '?' prefix character. Literals can form conjunctions and disjunctions, and can be negated;

(and (p a1) (q ?x) (r ?x))
(or (p a2) (q ?y))
(not (p a3))

where "and" indicates a conjunction, "or" a disjunction, and "not" a negation. OWL sentences have the following format:

(=>P Q)

The "=>" indicates that this is an implication; the first argument, P, is the antecedent and the second, Q, the conclusion. This expression is read as "If P is true, then conclude that Q is true as well". The arguments are subexpressions that can be any combinations of literals and conjunctions, disjunctions, negations, and implications thereof, as in the following:

(=>(p ?x) (q ?x))
(=>(and (p ?x) (not (p ?y))))
(or (r ?x a1) (r ?y a2))

The Ontology Works Language (OWL) is the primary language used for expressing ontologies in the Ontology Management System A (OMS). A more detailed description follows. OWL consists of a subset of the KIF language extended with certain special functions and restrictions designed to support database engineering applications using the Ontology Works generation software. While not a strict KIF subset, OWL is upward compatible with KIF in that any ontology specified in OWL has a straightforward expression in KIF. For the most part, we will describe only those features of OWL which deviate from the syntax and semantics of the KIF specification.

KIF was designed as a language to facilitate the exchange of declarative knowledge between information systems. While useful for that task, KIF is in some ways overly complicated and in some ways inadequate for the job of supporting database engineering, which is what the OWL software is designed to do.

As mentioned in the introduction, OWL is based on the Knowledge Interchange Format (KIF) developed by the Stanford University Knowledge Systems Laboratory. Reference the original Draft Proposed ANSI Standard dpans for a description of the KIF specification that OWL was based on.

KIF has a straightforward lisp-like syntax for expressing formulas. It has a first-order syntax, with extensions for creating definitions and a metalanguage which permits manipulation of KIF sentences. The following is a description of the KIF subset that OWL uses:

```
normalchar::=upper|lower|digit
expression::=term|sentence
term::=
    variable|constSymbol|sentOp|owlAtom|funTerm|quotedTerm
owlAtom::=word|string|charBlock
word::=normalchar|word normalchar
sentence::=constSymbol|literal|logSent|quantSent
variable::=indVar|seqvar
indVar::=?word
seqvar::=@word
literal::=(predicate term*[seqvar])
logsent::=(not sentence)|({and|or|sentence+)|({=>|<=
    }sentence sentence)
quantsent::=(tforall|exists} (varSpec+) sentence)
varSpec::=variable|(variable constant)
sentOp::=not|and|or|=>|<=|forall|exists
constSymbol::=functor|constant
functor::=funSym|predicate
``` funSym::=word—variable—sentOp/disjoint with predicate and constant/
predicate::=word—variable—sentOp/disjoint with funSym and
constant/
constant::=word—variable—sentOp/disjoint with funsym and predicate/
funTerm::=(funSym term*[seqVar])
quotedTerm::=(quote expression)|'expression
string::=/double-quoted strings/
charBlock::=# int(n) q character^n|# int(n) Q character^

(where {a|b} groups together a choice of a or b and / . . . / is a comment description) along with the restriction that funSyym, predicate, and constant are all disjoint.

A structural argument is any argument to a predicate or function which is not atomic. OWL, unlike KIF and other ontological languages, is designed to be syntactically unambiguous: ftmction terms literals used as terms can be syntactically disambiguated. Consider the following formula:

(knows fred (likes sally iceCream))

It is impossible to tell syntactically whether the term (likes sally iceCream)

is a literal or a function term. One would have to know semantically whether likes was a predicate or a function. Two specially interpreted functions and one predicate are added to OWL to handle this situation:

form: formula−>formula fid: posInt−>formula formFid: posint×formula

Formula arguments to literals or function terms (excluding form) must appear within a form or fid function term. These functions are used to facilitate unambiguous parsing with respect to literal and formula arguments.

The function form takes a formula as an argument and denotes that formula; it acts as a quoting function. It is used to refer to the textual representation of a formula. For example:

(holdsIn ?t (form (p ?x)))

indicates that the formula denoted by (p ?x) is true during the time interval denoted by ?t.

The function fid takes a formula identifier (a positive integer) as an argument and maps to that formula. This function is used to make assertions on a particular target formula whose identifier is known. The identifier argument is the one that the OMS associates with the original input formula (not an internal nor transient form). For example:

comment (fid 101) "my comment")

(=>(cpred (fid ?X) p) (comment ?X "my comment"))

The first formula asserts a comment on the formula with id 101; the second infers a comment on every formula that has a conclusion predicate p (assuming cpred is defined in the metalanguage to denote such predicates). Thus, the function fid gives the ontology writer a great deal of flexibility in making meta-level assertions about formulas stored in the OMS.

The predicate formfid is used to associated the textual representation of a formula with its stored identifier:

(formfid 101 (form (=>p q)))

indicates that id 101 is the id associated with the quoted formula.

The listof function is the only variable arity functor allowed in OWL. With the exception of listof, no arity overloading of functor names is allowed. For example, there can not be a binary and ternary version of a particular predicate.

Explicit quantification is restricted to individual variables; it is not allowed over sequence variables. Sequence variables must be free in every formula, where they will fall under an implicit universal quantification. Relation and function variables can be used as arguments to literals; however, these variables can only appear in a functor position within the second argument of the schema predicate, and they must be mentioned in the first argument to the schema literal (so they are bound by instantiating the schema template). Quantification over these variables ranges over the relations/functions that are denoted by named predicate/function symbols (not over all possible relations/functions). This interpretation of such second-order syntax is the same as XSB's HiLog and similar to the general model semantics of second-order logic.

A very useful feature of OWL is the ability to define axiom schemas . An axiom scheina is a sentence which acts as a template for creating new sentences. OWL uses the schema predicate for associating a literal with a template expansion:

(schema <literal><20-sentence>)

The first argument is the literal pattern that represents the schema literal and the second is a second-order sentence used as the schema expansion. For example, establishing a system of types represented by unary predicates would involve asserting a set of sentences of the form (=>(p ?x) (q ?x))

saying that "p is a subtype of q". All of these sentences have the same pattern and can easily be represented with a schema template—OWL uses the sup predicate (for super-type) to represent such sentences:

(sup p q)

with the following schema literal to associate an expansion:

(schema (sup ?p ?q) (=>(?p @args) (?q @args))

(skipping the form wrapper around the literal arguments). OWL allows for second-order syntax in the second argument to the schema predicate, but requires that all second-order variables appear in the first (so that they can be instantiated when expanding the schema). The schema relation is purely extensional—it cannot be used in the conclusion of more complex rules. The OMS does allow the form wrapper to be skipped within schema literals for convenience.

The OWL schema predicate has a natural axiomatization in KIF:

(schema L F$_1$)==(−>L (wtr F$_2$))where F$_2$ is F$_1$ preceded by the KIF backquote operator (ˆ) and all second order variables are preceded by the KIF unquote (,) operator. Thus, the OWL schema predicate has the effect of creating a limited type of macro facility, capable of allowing a concise sentence stand in for a set of sentences.

Here is how the sup example would be translated into pure KIF:

(−>(sup ?p ?q) (wtr ˆ(=>(,?p @args) (,?q @args))))

Axiomatizations can be provided for a predicate which are not intended to be its implementation. Such axiomatizations are provided only for the purposes of supplying a declarative reading of the predicate to aid in documentation. This is done with the predicate axiom:

(axiom <literal><20-sentence>)

The first argument provides the literal pattern for the target predicate and the second provides a (possibly second-order) sentence axiomatization of the predicate's definition. For example:

(axiom (isa ?x ?t) (?t ?x))

(skipping the form wrapper around the literal arguments). The axiomatization provided for isa is not meant to be the implementation for i.—it is provided as a declarative description of what is a means. There should be at most one axiom defining each predicate and the target predicate should not be used as the head predicate of a defining rule. The OMS does allow the form wrapper to be skipped within axiom literals for convenience.

Glossary

Conjunctive Normal Form (CNF): A normal form for first-order languages that has each expression represented as a conjunction of disjunction. For example:

(and (or (p a1) (q a1)) (r a4))

would be in CNF form.

Cyc: A general-purpose ontology developed by Cycorp (www.cyc.com), of Austin.

Cycle, or recursive component, in dependency graph: Each strongly-connected component in the dependency graph for a database forms a cycle, or recursive component. Such a construction indicates that the predicates involved are recursively defined.

Deductive Database (DDB): An extension of relational (and object-oriented) databases that allows for recursive rules.

Dependency Graph: The rules used to define a predicate (or view) induces the dependency graph where the conclusion predicate is dependent on each predicate (or view/table) in the antecedent.

Function: The functors for function terms.

Intensional Database (IDB): In a relational database, this corresponds to the view calls; in a deductive database, the IDB is the set of predicates (or calls) that are defined only by rules and not by direct factual assertions.

Extensional Database (EDB): In a relational database, this corresponds to the base tables; in a deductive database, the EDB is the set of predicates (or calls) that are defined only by direct factual assertions—they have no rules concluding any of these predicates.

First-order Predicate Calculus (FOPC): Within this document, this is intended to refer to a first-order logic with classical semantics.

Functor: In a structural term like (p b) (in Prolog syntax: p (b)), the p is the functor. If the structure is a literal, then the functor would be a predicate; if a function term, then a function.

Integrity Constraint (IC): An integrity constraint is an assertion about the state of the database that must hold true. If the IC were violated, then the database is said to be in an inconsistent state. The denial form is a form of the IC that "denies" the consistency of the database so that the success of the denial form indications a violation of the IC.

Memoization: In relational databases, memoization is the same as view materialization. Memoization is a general term for referring to the process of caching results. In a database context, this would be a cache of the answers to a particular query.

Ontology: Used here to refer to a logic-based model of a target subject domain. The model uses an expressive language to capture complicated real-world relationships and constraints. The methodology used to create ontologies borrows from the work done in the philosophical area of ontology, the study of being.

Ordinary predicate: An ordinary predicate in relational databases is one defined by a table as a view. A non-ordinary predicate is defined by a stored procedure.

General-purpose ontology: Used here to refer to large, FOPC-based ontologies oriented towards giving a declarative specification of common-sense knowledge, and extending that description into specific domains. Cyc epitomizes this type of system.

Predicate: The functors for literals.

Population Rule: These rules are used to conclude membership in a type, but do not include the usual rules used to implement the type hierarchy. For example, if T2 is a sub-type of T1 (so that each T2 is also a T1), then the rule (=>(T2 ?X) (T1 ?X))

would not be considered a population rule, but (=>(and (p ?x ?y) (q ?x)) (T2 ?X))

would be.

Rectification: A rectification version of a rule is such that the conclusion has only variables as arguments.

Stratified database: Deductive databases allow for recursive rules, which result in a recursive component in the dependency graph. A stratified database is one that does not have any recursive components that has a rule that involves a negated call on a member predicate. For example, the following rules form a negated recursive component:

(=>(and p (not q)) r)

(=>r q)

The component of the dependency graph being {r,q} since r depends (negatively) on q, and q depends on r.

Strongly-connected Component (SCC): A set of nodes in a graph form a strongly-connected component (SCC) if each node in the set can reach each other node in the set.

Sub-goal: A subgoal is an antecedent in a rule, also referred to as a sub-query (the conclusion being the primary query).

Type-checking predicate: A predicate (or call) used to check that a target symbol has a declared target type. For example, (isa b person) checks if b has type person.

Well-founded Semantics (WFS): A declarative semantics for logic programs. XSB: A Prolog-like language developed by the State University of New York, Stony Brook. The key distinguishing feature of XSB from other Prolog systems is that it evaluates Prolog programs according to the Well-founded Semantics (WFS).

Description of the Preferred Embodiments

Referring now to the drawings, and more particularly to FIG. 1, there is shown the overall system for the deductive database (DDB) generation. This system performs the process of creating and maintaining ontologies and a process for semi-automatically generating deductive databases from ontologies. The ontology 10 is an Ontology Works language (OWL) ontology managed by the Ontology Management System (OMS) 11. OWL was designed to be used as an ontological specification for databases, adding many constructs for this specific purpose. OWL is based on knowledge interchange format (KIF), a public domain ontological language (http://logic.stanford.edu/kif/dpans.html). Features added to support database specification and generation include the following predicates:

1. (def S P) indicates that input sentence S is intended to provide a definitional rule for predicate P. This means that any rule versions of S that do not conclude P are considered to be integrity constraints. Also, any rule from other input sentences that conclude P that do not also have a de f assertion on them are considered to be integrity constraints.

2. (constraint S M) indicates that input sentence S is intended to be an integrity constraint. M is a message template for reporting constraint violations.

3. (fixedPred P) indicates that the extent of P is fixed at the time of database generation, and can be fully computed.

4. (transitiveClosure TC P) indicates that TC is the transitive closure of predicate P. This is used to indicate that while TC is transitive, it actually denotes the smallest transitive relation that contains the relation denoted by P. This allows a linearly recursive rule to completely define TC versus a non-recursive rule (which would be required if all that was known was that TC was transitive).

An OMS ontology has a hierarchy of categories, which denote classes of objects (note that this is different from the object-oriented notion of class). This hierarchy is partitioned by the type and attribute hierarchies. The type hierarchy consists of the categories that can participate in predicate signatures, and corresponds to the symbols that become types within a generated database. The type hierarchy is fixed at the time of a database generation, meaning that if can be completely computed by the generation application and can be expected to remain static within the generated database. Attributes are categories that are not types, meaning that they do not participate in predicate signatures and do not become types within generated databases, nor is the set of attributes expected to remain fixed within such databases. This differentiation facilitates database generation by providing an explicit hierarchy of categories intended to become types (or classes) within generated databases. The category hierarchy provides a way of handling types and attributes.

The OMS ontology consists of a set of OWL sentences, each of which has an associated conjunctive normal form (CNF) version. The database generator 12, which comprises both deductive database generator (DDBG) 12A and relational database generator (RDBG) 12B components, consists of applying a series of conversion and review steps on the CNF of the OWL sentences within the input ontology. It generates a pre-DDB 13A (or pre-RDB 13B), which defines the schema of the database, as well as provides the rules required for reasoning and integrity-constraint checks. The process followed for generating the pre-DDB 13A forms is outlined below, followed by a more detailed description. The pre-RDB generation is also described. In addition, the present invention can also generate a schema for an object-oriented database.

Figure 2:
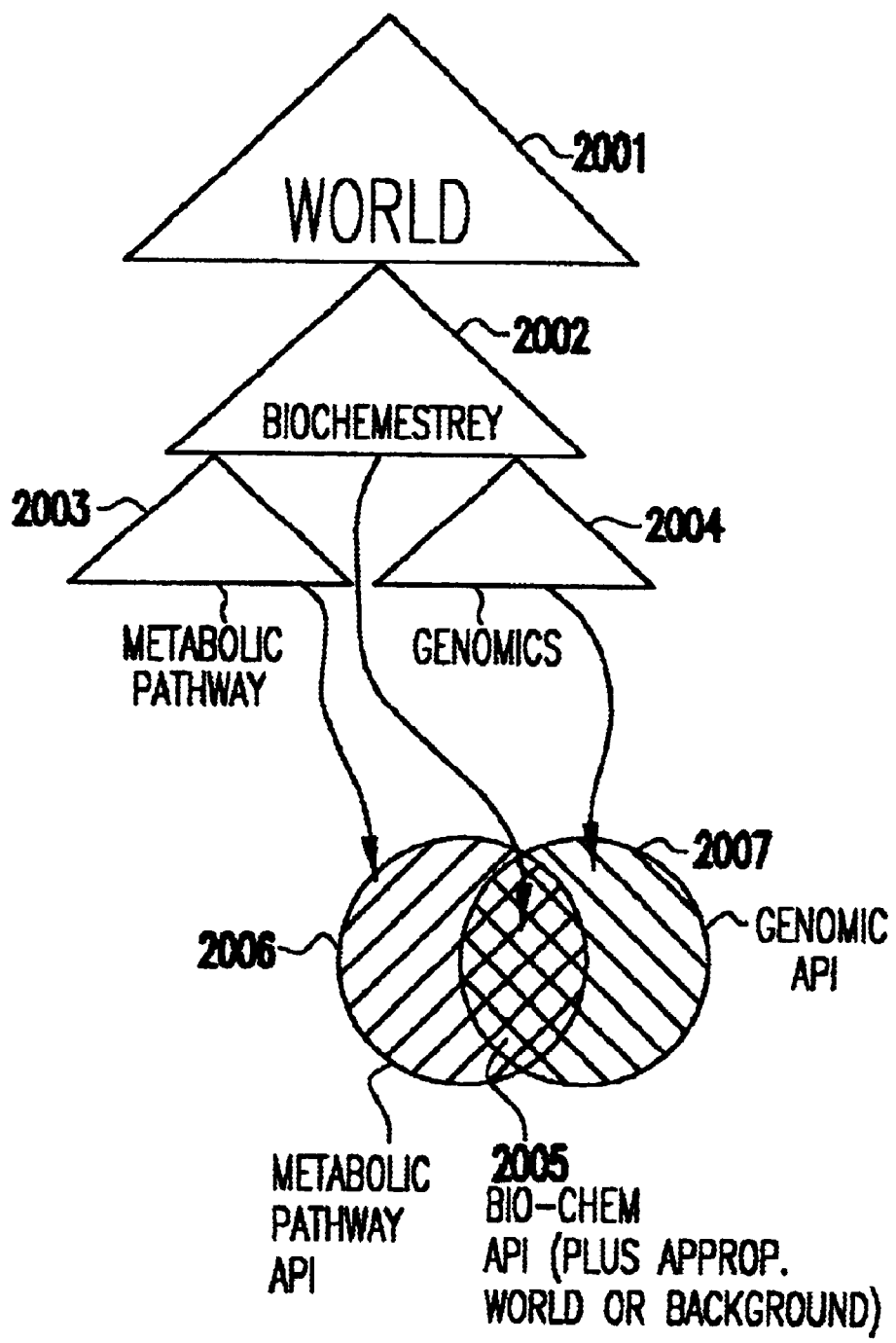
FIG. 2 is a conceptual diagram of the database generation system from the perspective of parent-child ontological relationships and a resulting API.

Referring now to FIG. 2, there is shown a high level diagram showing a conceptual diagram of the database generation system from the perspective of parent-child ontological relationships and a resulting API. The triangles 2001–2004 represent ontologies. For instance, the ontology which represents the world, or background information is represented as the parent ontology 2001. The target databases for which to create API's are for metabolic pathways 2003 and genomics 2003 ontologies. Both of these ontologies are children of the biochemistry ontology 2002, which is a child of the world ontology 2001.

The API's for the target databases that are generated by the present invention have a common element 2005 based on the common elements in the parent ontologies (e.g., world 2001 and biochemistry 2002). By defining a hierarchy of ontologies, the present invention allows one to develop API's for target databases (related or siblings) using a common method, with common parent ontologies. The elements of the parent ontologies is automatically generated, and repeatable, in the targeted API 2006 and 2007, by virtue of the ancestry.

Figure 3:
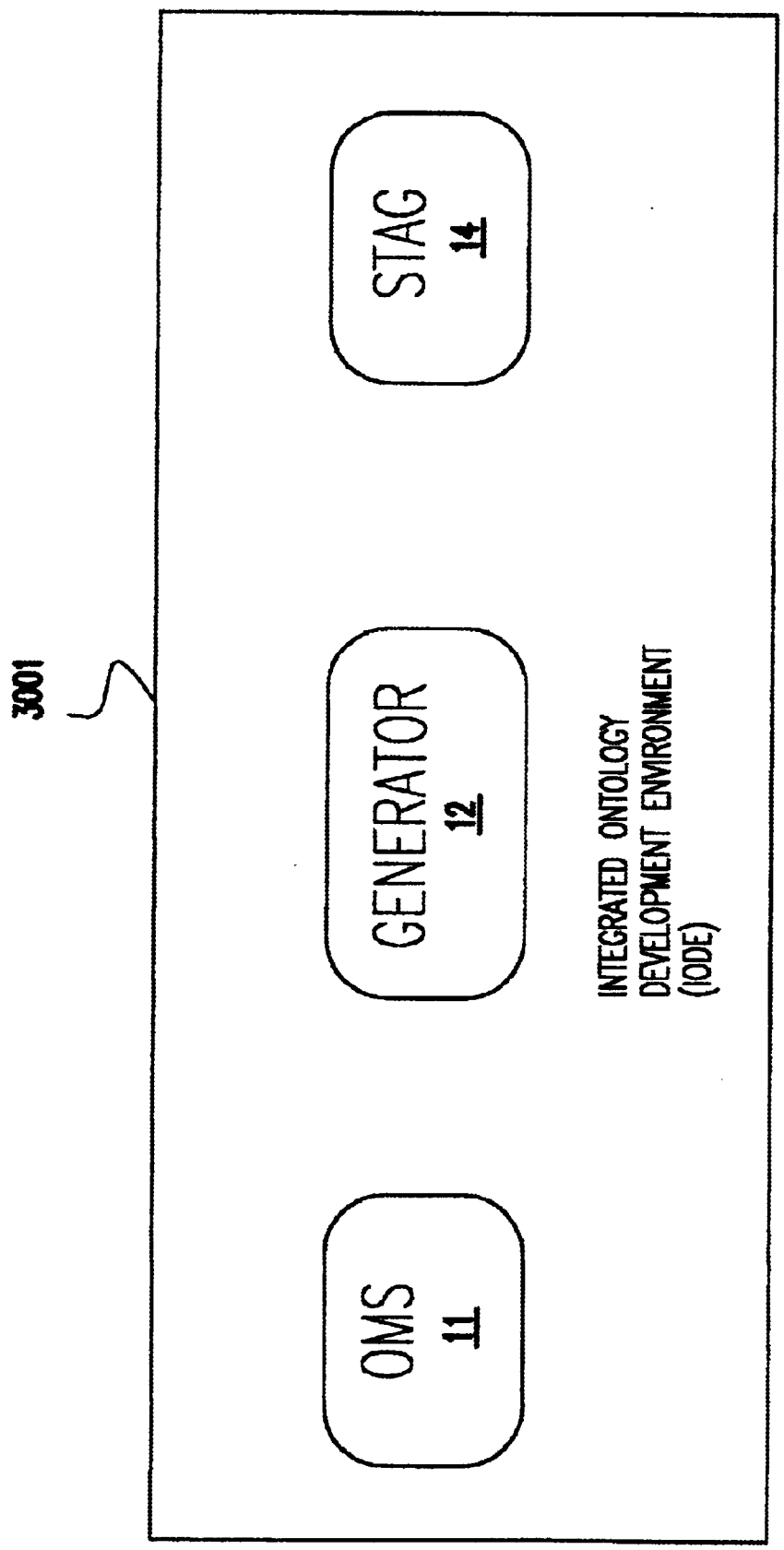
FIG. 3 is a high level conceptual diagram of the Integrated Ontology Development Environment (IODE)

FIG. 3 shows a high level conceptual diagram of the Integrated Ontology Development Environment (IODE) 3001. The IODE comprises an ontology management system (OMS) 11, a database generator (DBG) 12, and a strongly typed API generator (STAG) 14. This integrated environment allows a designer to define appropriate ontologies and automatically generate a database (of a selected type) and a API for use in accessing the generated database. The world or background or parent ontology(ies) help to define constraints that limit and define the acceptable use of the database, and are incorporated into the API. This enables the data stored in the database to be maintained as clean as possible, while making the integrity constraints as transparent as possible to the end user of the API. The components of the IODE will be explained more fully below.

A key aspect of the present invention is the capability to generate a database. Steps 1–8, below are common to generation of deductive, relational and object-oriented databases, according to the preferred embodiment of the invention. Steps 9–14 are used to generate deductive databases, and steps 15–18 are used to generate relational databases. An object-oriented database uses steps similar to those used for relational databases. With the following description, it would be apparent to one skilled in the art how to modify these steps to accommodate various database types.

1. Skolem-term conversion
2. CNF-to-rules conversion
3. Population-rules review
4. Extensional database (EDB) conversion
5. Added Equality Reasoning
6. Stratification conversion
7. Fill type-checking gaps
8. Assertion identifier (AID) addition
9. Temporal conversion
10. Non-recursive optimizations
11. Positive-recursion optimizations
12. SCC review
13. Memoizing review
14. Subgoal reordering
15. Distinguishing ordinary and non-ordinary predicates
16. Generating type tables
17. Generating base tables
18. Generating view definitions.

Figure 4:
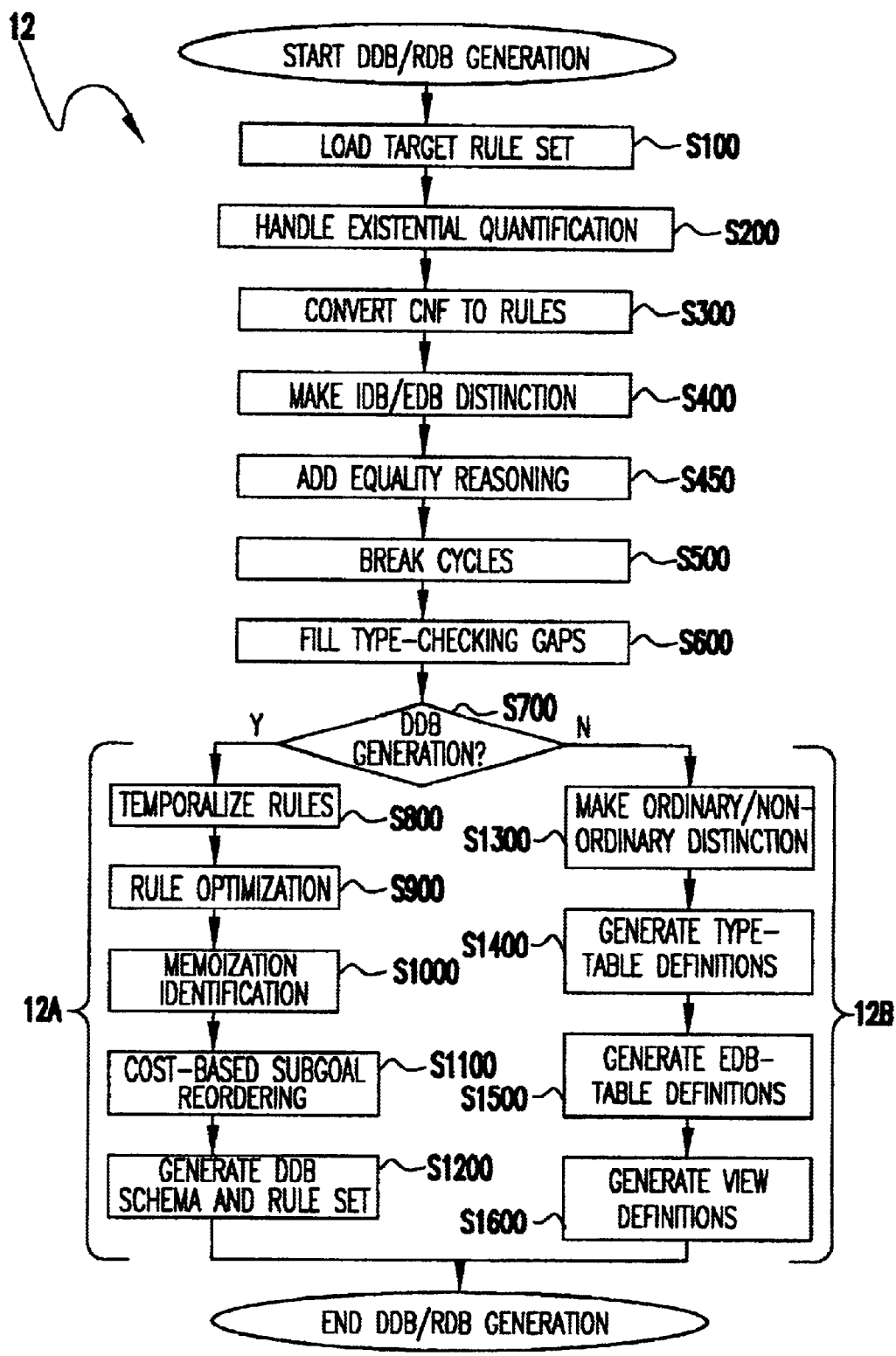
FIG. 4 is a flow diagram illustrating the logic of the DDB/RDB generation process.

According to the preferred embodiment of the invention, these above steps are performed in accordance with the high level flow diagram as illustrated in FIG. 4. The specifics of these steps will be described below in more detail. Referring now to FIG. 4, the database generation commences by loading the target rule set in step S100. The existential quantification is handled in step S200. The CNF are converted to rules in step S300. A distinction is made between IDB and EDB in step S400. Equality reasoning is added in step S450. Cycles are broken in step S500. Type-checking gaps are filled in step S600.

A determination is made in step S600 as to whether a deductive database (DDB) or a relational database (RDB) is to be generated. It would be apparent to one skilled in the art that other types of databases could be selected, also. If a DDB is selected, then processing continues with step S800 where rules are temporalized. The rules are then optimized in step S900. Memoization identification is performed in step S1000. Cost-based sub-goal reordering is performed in step S1100. The DDB schema and rule set is then generated in step S1200.

If a RDB is selected, ordinary and non-ordinary predicates are distinguished in step S1300. Type tables are generating in step S1400. Base tables are generated in step S1500 and then view definitions are generated in step S1600. These steps are described in more detail below.

Skolem-term Conversion

Figure 5:
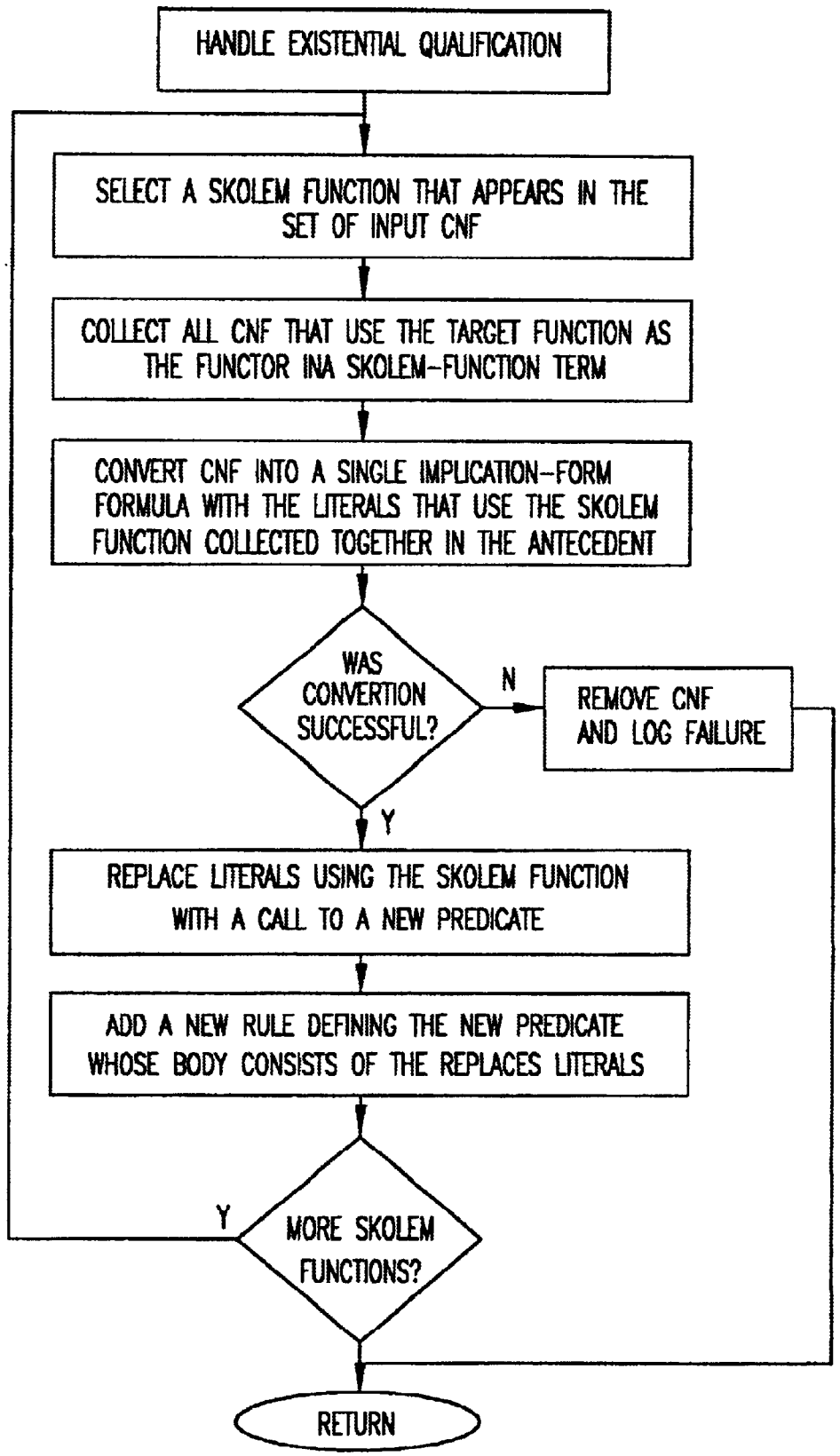
FIG. 5 is a flow diagram illustrating the logic of the process of translating existential quantification.

Referring now to FIG. 5, there is shown the a process for skolem-term conversion. Skolem-terms are function terms added during the process of generating the CNF version of an input sentence, replacing existential quantification. For example, the input sentence (=>(exists (?y) (q ?x ?y)) (p ?x)

would have the following corresponding CNF (or (not (q ?x (skf5 ?x) ) ) (p ?x)

This CNF would be converted into (=>(ex8 ?x) (p ?x))

(=>(ex8 ?x) (q ?x ?y))

(given in implication-form for each of reading) where ex8 is a new predicate. With a standard Prolog-like reading of such sentences, the second (added) sentence represents the existential quantification from the original.

According to the invention, a skolem function is selected that appears in the set of input CNF, in step S220. All CNF that use the target function as the functor in a skolem-function term are collected in step S220. The CNF are converted into a single implication-form formula with the literals that use the skolem function collected together in the antecedent, in step S230. A determination is made in step S240 as to whether the conversion was successful. If so, the literals are replaced using the skolem function with a call to a new predicate, in step S260. A new rule is then added, in step S270, defining the new predicate whose body consists of the replaces literals. A determination is then made as to whether there are more skolem functions, in step S280. If so, the process continues at step S210. If the conversion in step S240 was not successful, the CNF is removed and a failure is logged in step S250, and the process ends.

CNF-to-rules Conversion

This step in the process is responsible for converting CNF into rule and integrity-constraint (IC) rule formats. The process is improved over the process described in Peterson, et al. For example, (=>p (or q r)

could generate the following two rule versions and IC rule version:

(=>(and p (not q)) r)

(=>(and p (not r)) q)

(->(and p (not (or q r))) ic8)

(where ic8 is a new predicate). The first two are logically equivalent under first-order predicate calculus (FOPC) to the original; in the third, an IC rule given in denial form which would enforce the condition that if p is provable, then at least one of q and r must be provable as well.

Automatic decision making routines are used to decide if a particular rule version is desirable or not. For example, if a CNF has a conclusion with the numeric<function, then the rule version making that conclusion would not be interesting, since there are built-in ways of comparing two numbers. The following summarizes the tests performed on the rule versions to see if they are interesting enough to keep. If a version satisfies one of these conditions, then it is dismissed as not interesting:

1. Concludes a predicate added from the Skolem-term conversion step.
2. The rule flounders, allowing for arbitrary ordering of the subgoals.
3. Concludes a predicate with any one of the ontology type builtInPred, systDefinedPred, or extensionalPred.
4. Concludes a predicate that has a def assertion on it and the originating input sentence is not considered definitional according to the interpretation of the def assertions.

Figure 6:
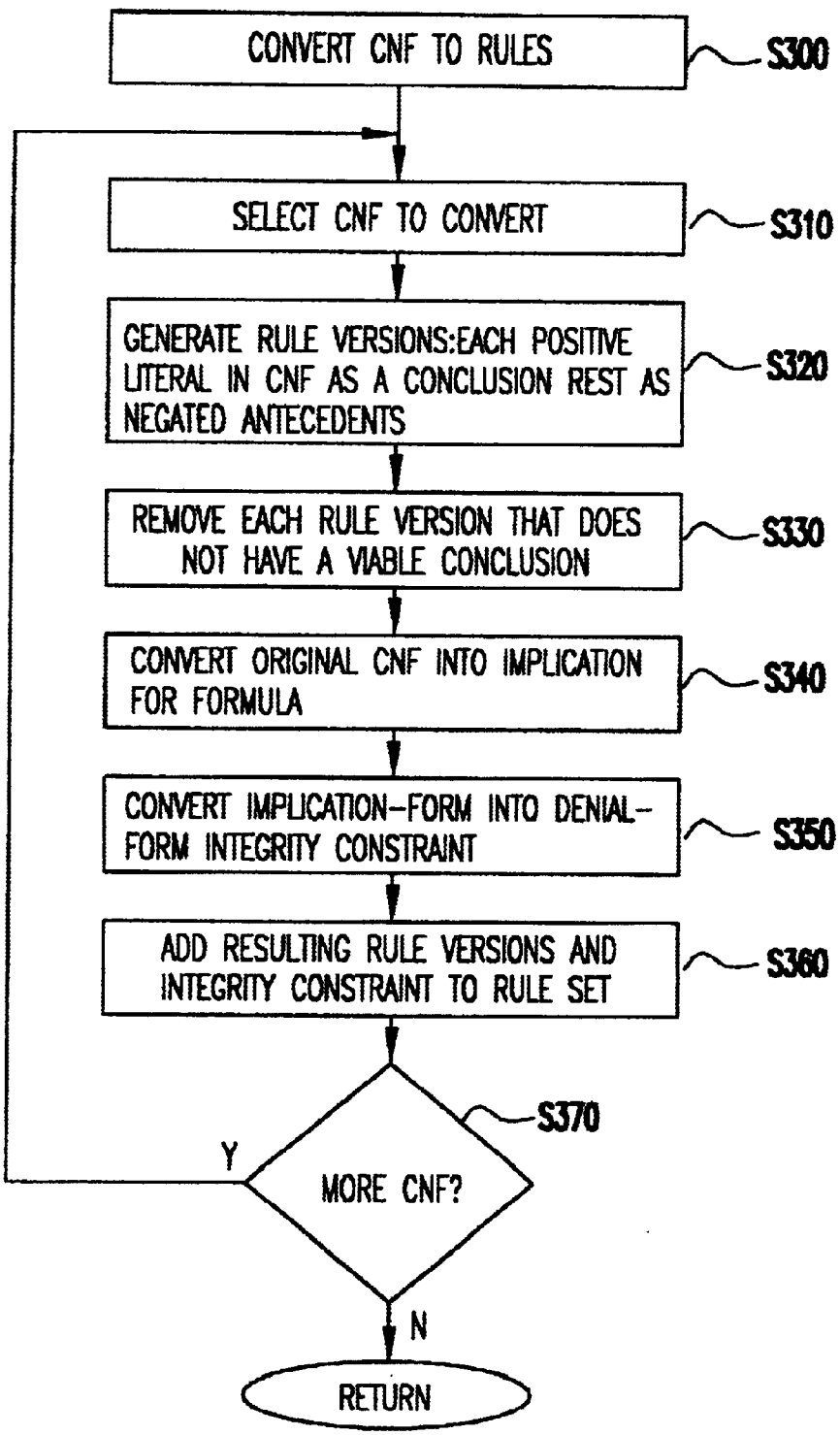
FIG. 6 is a flow diagram illustrating the logic of the process of translating CNF to rules.

Referring now to FIG. 6, the CNF is selected to convert, in step S300. Rule versions are generated in step S320, such that each positive literal in CNF is a conclusion and the rest are negated antecedents. Rule versions are removed that do not have a viable conclusion, in step S330. The original CNF is converted to implication-form formula in step S340. The implication-form formula is converted into denial-form integrity constraints in step S360. A determination is made as to whether more CNF need to be converted in step S370. If so, processing continues with step S310. If not, conversion is complete and this process returns.

Population-rules Review (not Shown)

Population-rules review processing is performed after conversion of the CNF to rules. Population rules are considered to be rules used to infer the type of a symbol, but which is neither a standard subtype rule nor a generic type-checking rule. A standard subtype rule is one of the form (=>(p ?x) (q ?x)

indicating that p is a subtype of q (since all that are a p are also a q). The rule recognized as the generic type-checking one looks like (=>(and (isa ?x ?t1) (supLTE ?t1 ?t)) (isa ?x ?t)

where (isa ?x ?t) indicates that ?x has type ?t, and (supLTE ?t2 ?t) indicates that ?t1 is a sub-type of ?t2 or is the same as ?t2. This rule indicates that ?x has type ?t if it has a subtype of ?t.

Population rules often cause efficiency problems. This review stage allows the user to peruse the population rules and decide if any can be removed.

EDB Conversion

This stage is improved over the process as described in Peterson et al. and establishes a distinction between the extensional and intensional part of the database. Each predicate which can have both factual assertions and rule assertions on it is split into two: one retains the same name as the original and has the rules asserted to it, and the other is the extensional version for which facts intended for the original are asserted. A rule is added connecting the intentional and extensional versions. For example, if there are rules concluding p, and it should also be allowed to accept explicitly asserted facts, then p_EDB and p_store are created to accept those facts and the rules (=>p_EDB p) (EDB_call rule)

(=>p_store p_EDB) (EDB_store rule)

are added. The call version is used as a convenient way of referencing the stored information. The store version may be more complicated, splitting the arguments for storage efficiency.

Figure 7:
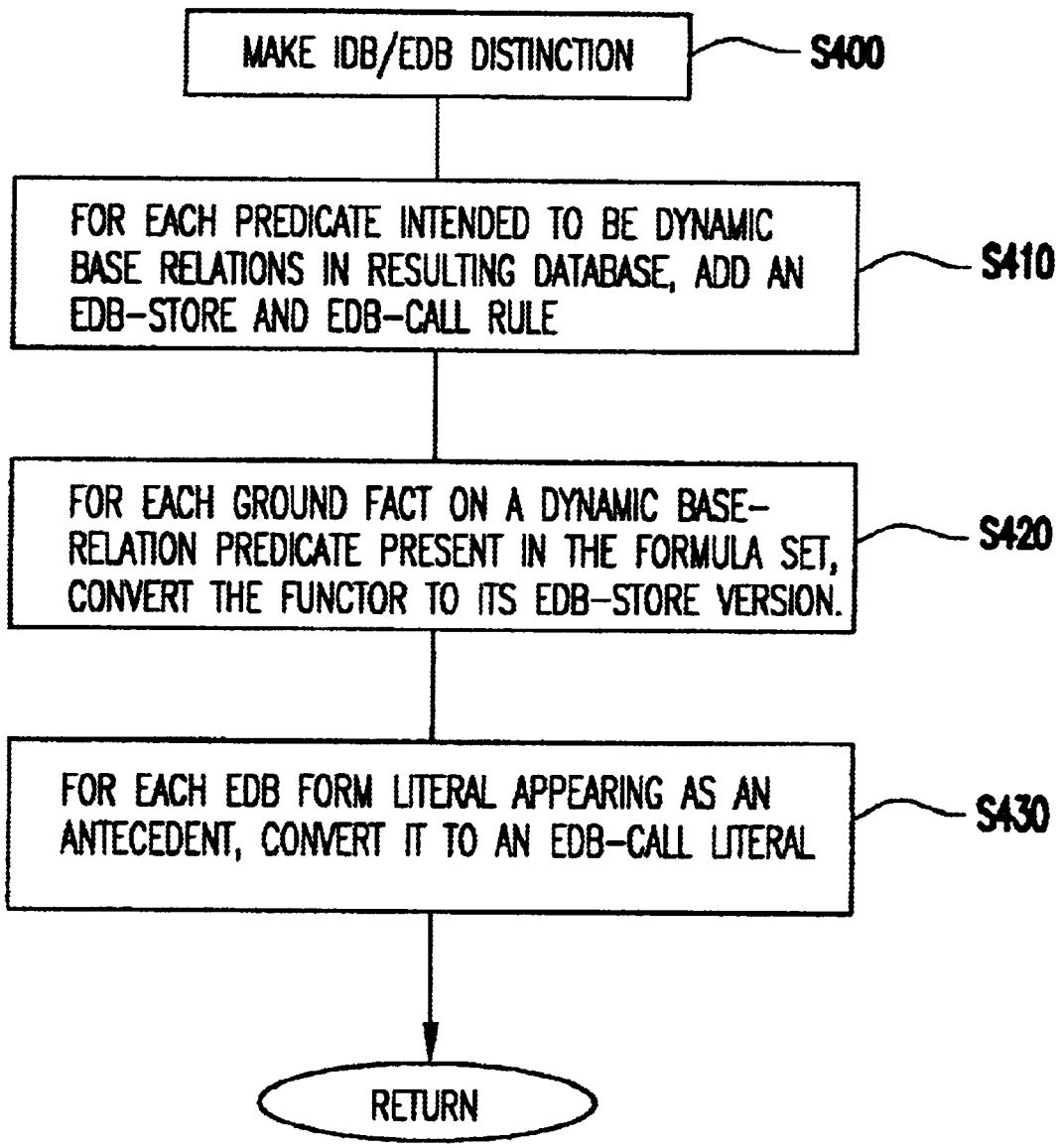
FIG. 7 is a flow diagram illustrating the logic of process of distinguishing EDB (extensional database) and IDB (intensional database)

Referring now to FIG. 7, an EDB-store version and EDB-call rule are added for each predicate intended to be dynamic base relations in the resulting database, in step S410. For each ground fact on dynamic base-relation predicate present in the formula set, the functor is converted to its EDB-store version, in step S420. Each edbForm literal appearing as an antecedent is then converted to an EDB-call literal, in step S430.

Added Equality Reasoning

Figure 8:
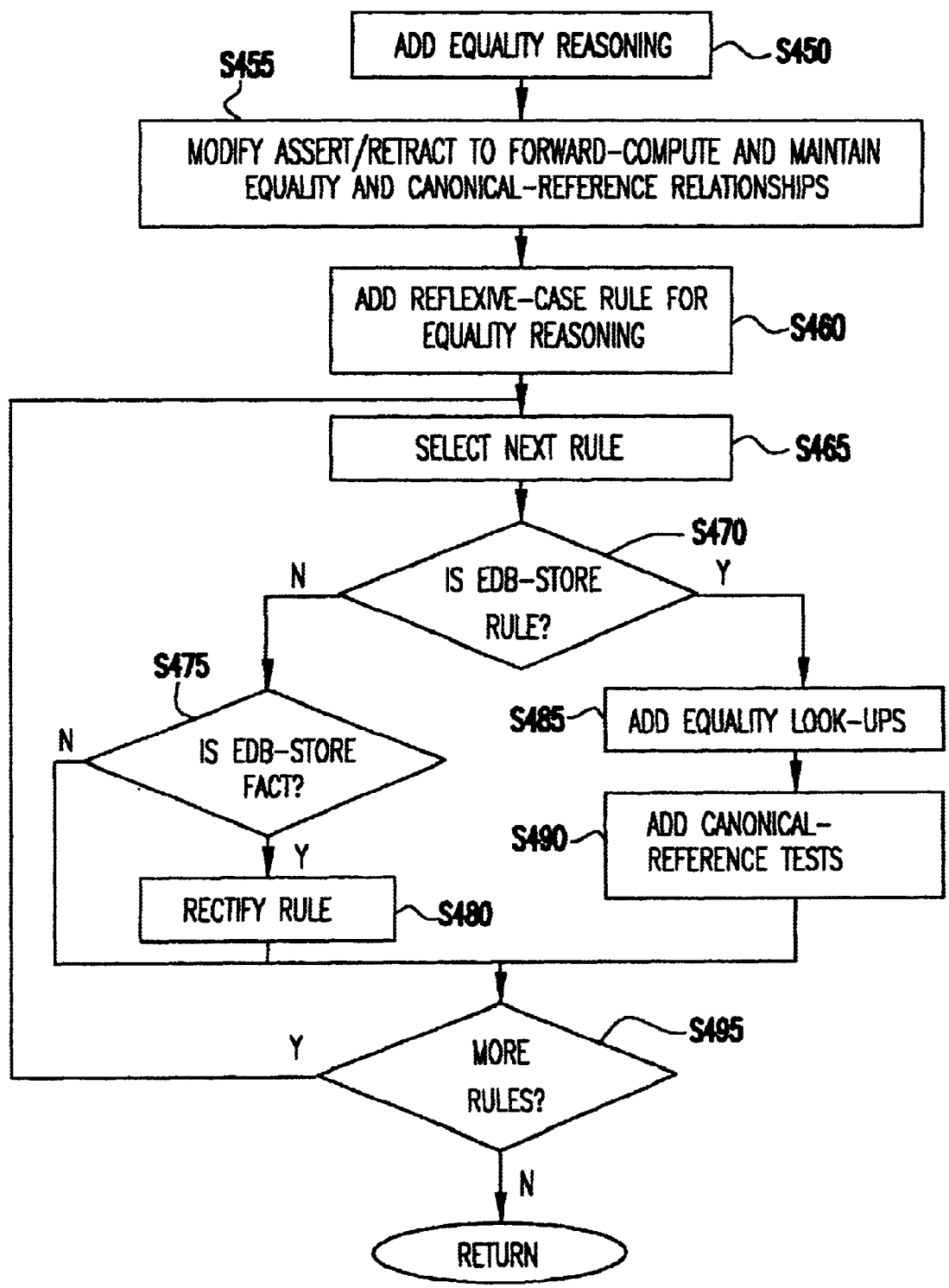
FIG. 8 is a flow diagram illustrating the logic of the process of adding equality and canonical-reference reasoning.

Referring now to FIG. 8, there is shown a flow diagram illustrating the logic of the process of adding equality and canonical-reference reasoning. Equality reasoning was not performed in the system described by Peterson et al. and improves the capabilities of ontological reasoning. The implementation also allows for the capability to retract and retain the original factual information in the databases. First, in the preferred embodiment, assert/retract calls in Prolog for the fact-base are modified to forward-compute and maintain equality and canonical-reference relationships, in step S455. Reflexive-case rule for equality reasoning is added in step S460. The next rule is then selected in step S465. A determination is made as to whether the rule is an EDB-store rule in step S470. If so, equality look-ups are added in step S485 and canonical-reference tests are added in step S490. If not, a determination is made as to whether the rule is an EDB-store fact in step S475. If so, the rule is rectified in step S480. A determination is made as to whether there are more rules in step S495. If so, processing continues at step S465.

Stratification Conversion

The input sentences from the ontology may be non-stratified;

however, the resulting DDB rule set is required to be stratified because of efficiency concerns. The stratification step detects negative loops in the predicate dependency graph and attempts to break such cycles using heuristics. If it is unable to break the cycle automatically, then the user is prompted with the cycle and required to identify rules to delete. The heuristics used are 1. If there is one formula involved in the cycle, then remove it.
2. If there is a formula in the cycle which is immediately negatively recursive and the user agrees, layer the conclusion predicate.

Layering a conclusion predicate proceeds as follows: Let the target rule be (=>(and p (not r)) r)

and in addition to that one, the rule set has the following rules concluding r:

(->q r)

(=>s r)

If the user decides to layer the target rule, then these three rules are converted into (=>(and p (not r1)) r)

(=>q r1)

(=>s r1)

(=>r1 r)

The last one bridges the original, r, with the new layering predicate, r1.

The intuitive reasoning behind this transformation is that the original is read as "conclude r if p is true and you can prove r without using this rule (or at least not immediately)".

Figure 9:
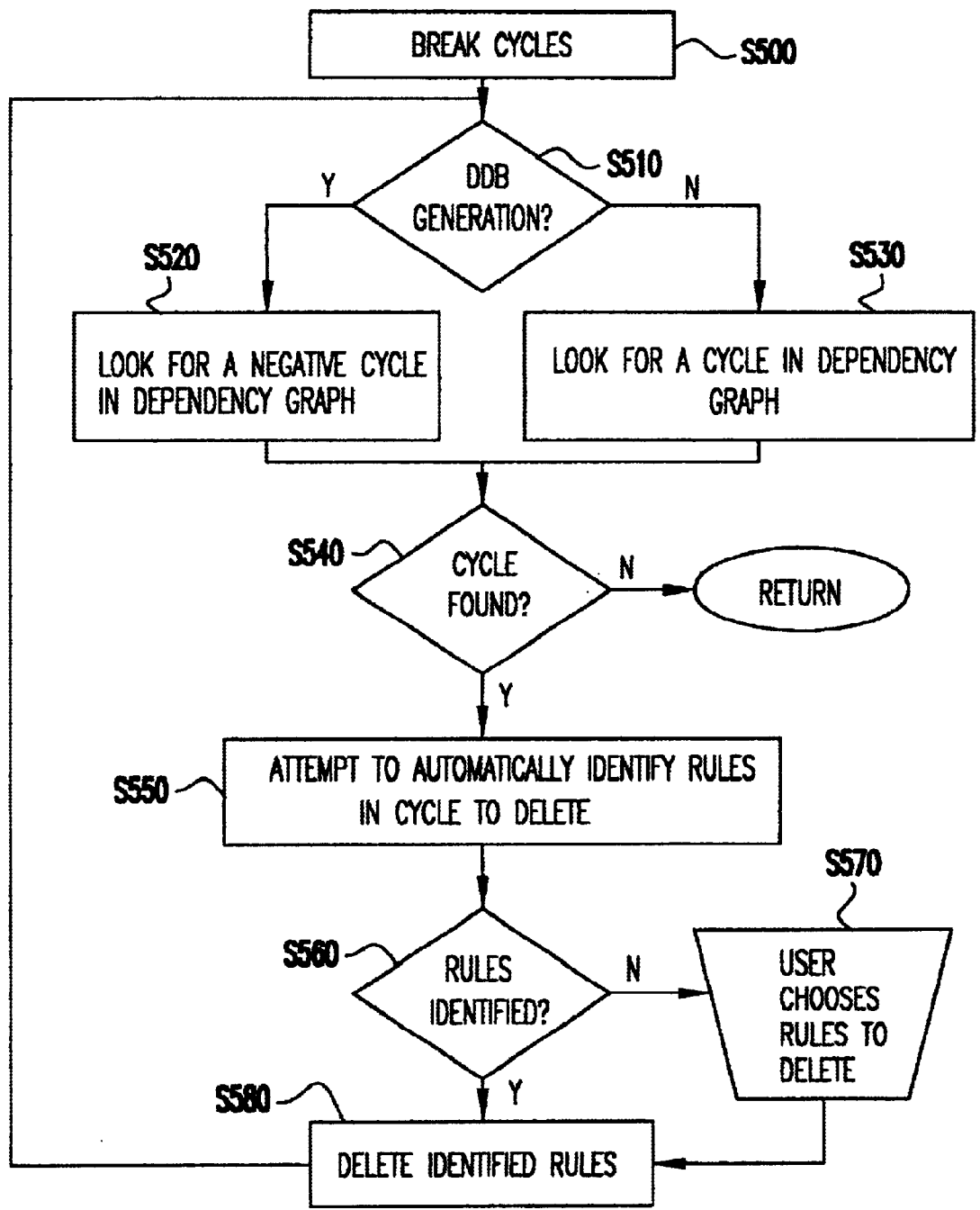
FIG. 9 is a flow diagram illustrating the logic of the process of breaking predicate-dependency graph cycles.

Referring now to FIG. 9, there is shown the process for stratification conversion. This process greatly improves the process described in Peterson et al. The present invention breaks cycles for both deductive and other types of databases. The system as described by Peterson, et al. only breaks cycles for deductive databases. For deductive databases, negative cycles must be broken. For relational and object-oriented databases, all cycles must be broken. First, a determination is made as to whether the target database is a DDB, in step S510. If so, negative cycles are identified, if they exist, in the dependency graph, in step S520. If not, all cycles are identified in the dependency graph in step S530 (for relational and O—O databases). A determination is made as to whether cycles were found in the identification steps, in step S540. If not, the process returns. If so, an attempt to automatically identify rules in the cycle to delete is made, in step S550. If rules to delete are identified as determined in step S560, then the identified rules are deleted in step S580. Otherwise, the user selects the rules to delete in step S570 and then they are deleted in step S580.

Fill type-checking Gaps

Figure 10:
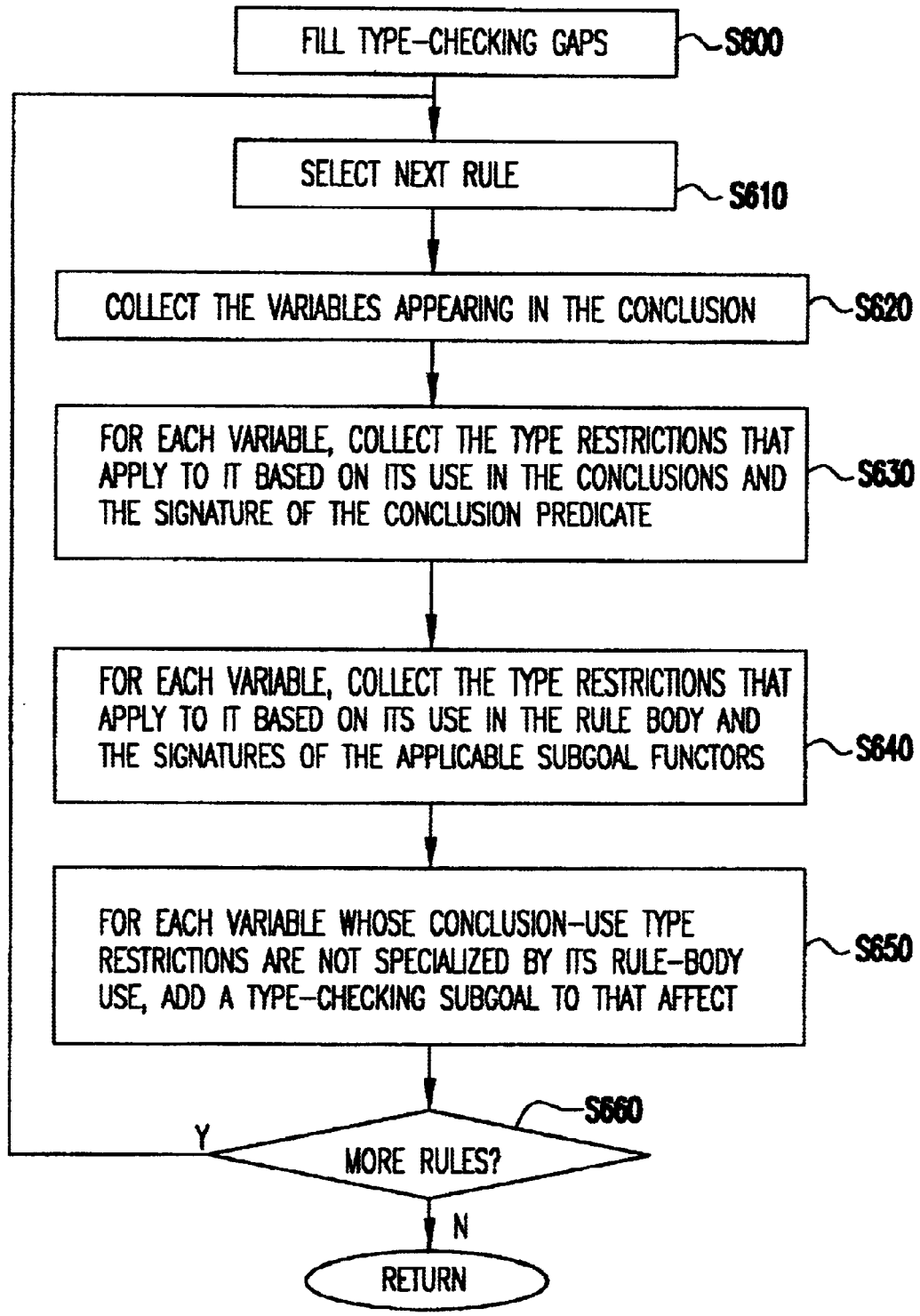
FIG. 10 is a flow diagram illustrating the logic of the process of filling type-checking gaps.

Referring now to FIG. 10, a process is shown for filling type-checking gaps. A gap occurs when the type signatures that apply to a variable in the conclusion are not subsumed by the types from the signatures of the subgoals that use the target variable. This process did not exist in the prior art systems. The next rule is selected in step S610. The variables are collected that appear in the conclusion in step S620. For each variable, the type restrictions are collected that apply to it based on its use in the conclusion and the signature of the conclusion predicate, in step S630. For each variable, the type restrictions are collected that apply to it based on its use in the rule body and the signatures of the applicable subgoal functors, in step S640. For each variable, whose conclusion-use type restrictions are not specialized by its rule body use, a type-checking subgoal to that effect is added, in step S650. A determination is made as to whether there are more rules in step S660. If so, the process repeats at step S610.

AID Addition (not Shown)

Assertion identifier (AID) processing is performed after filling type-checking gaps. Each fact asserted to the generated database is given an assertion identifier (AID). This AID is a unique identifier used to refer to that specific assertion. A different identifier is given to two assertions even if they are exactly alike. Handling these AIDS requires modifying the conclusion and subgoal literals within the rule set. Rules which have a single subgoal pass the AID along unchanged; rules with more than one subgoal leave the AID argument in the conclusion as is.

Temporal Conversion

The temporal model is implemented by modifying each rule and literal that must reason over time. Not all literals have temporal bounds—those that do not are not modified, and those that do are given a start-time and an end-time argument. This translation is based on the one described in Peterson et al., but is improved as follows. The translation described by Peterson et al. required a new rule for each binding pattern of the temporal arguments. The translation used in the DDBG 12 (FIG. 1) does not have such a requirement; rather, it modifies only the EDB rules, making the binding choices for the temporal arguments in this one place. For example, the EDB-store rules (given in a Prolog-style syntax)

p (X):–p_EDB(X).

p_EDB (X):–p_store(x).

are converted into p_EDB p(X,S,E):– p_store(X,A,S1), (en_p(A,E1)–>tCont2(S1,E1,S,E);

tCont2 (S1,now,S,E)).

where en_p maps an AID to its associated end-time and –>/; is the usual Prolog if-then-else clause. This modification to the EDB-store rule looks for an asserted p fact (with AID A) and its start time (S1). It then looks to see if an end-time has been asserted for it by referencing the associated en_p predicate. If one is not found, then the distinguished time point now is used as an end-time. The tCont2 call is a built-in call used to test that the (S, E) interval is contained by the (S1, E1) interval. If S or E is unbound, then it is set to the corresponding S1/E1 value. This modification performs the same function as the temporal argument binding-pattern rules used in the Peterson et al. formulation.

Figure 11:
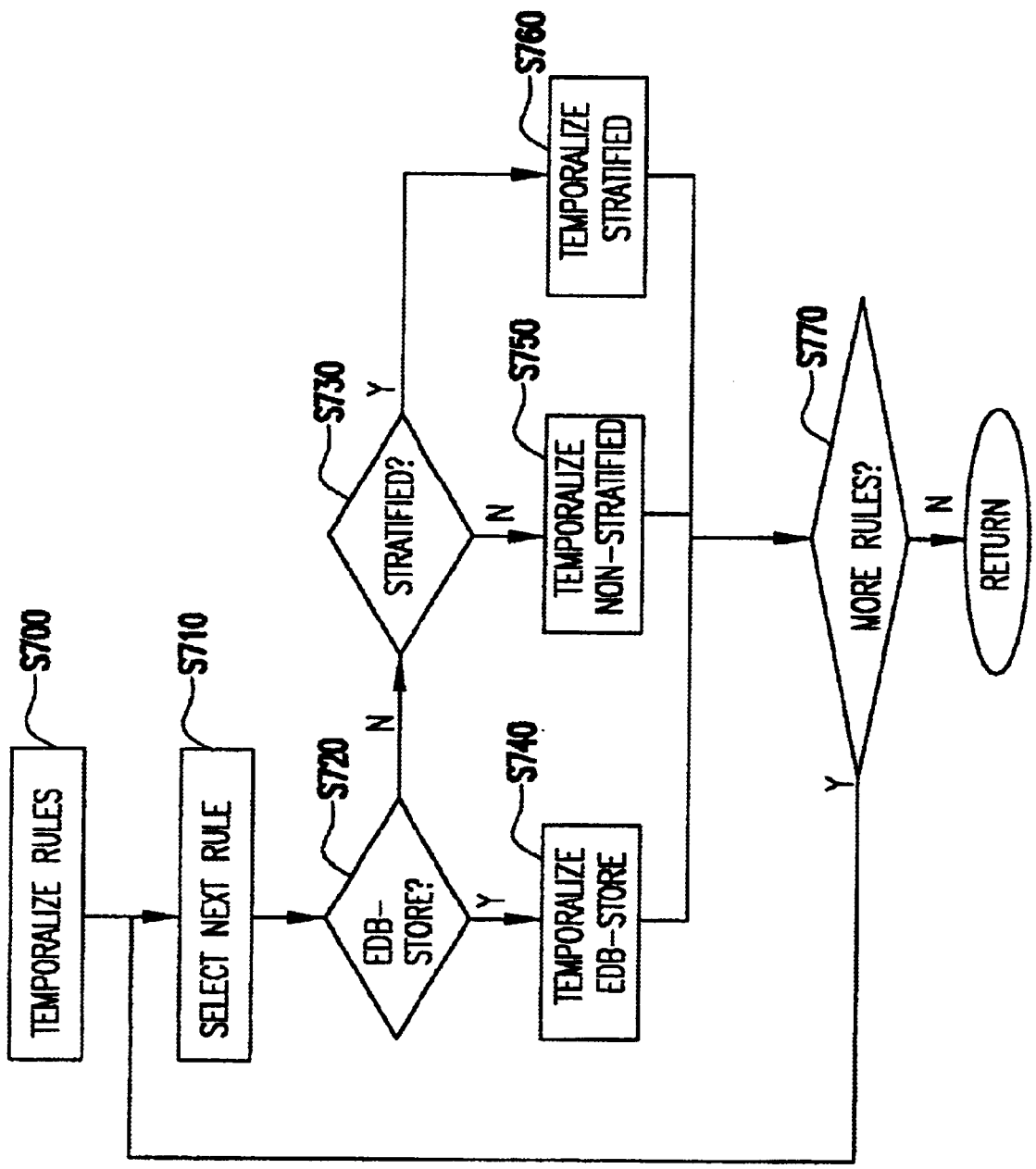
FIG. 11 is a flow diagram illustrating the logic of the process of temporal translation.

Referring now to FIG. 11, there is shown a flow diagram for temporal conversion. The next rule is selected in step S710. A determination is made as to whether this is an EDB-store rule in step S720. If so, the EBD-store is temporalized in step S740. Otherwise a determination is made as to whether the rule set is stratified in step S730. If so, then the stratified rules are temporalized in step S760. Otherwise, the non-stratified rules are temporalized in step S750. If there are more rules, as determined at step S770, then the process continues at step S710.

The formulation described in Peterson et al. requires a stratified rule set, but the database generator (DBG) 12 (FIG. 1) has an alternate temporal transformation that allows for non-stratified rules. This implementation of the temporal model transforms the rules so that they take the temporal interval of the positive subgoals and then look for subintervals of that for which none of the negative subgoals hold true. This is carried out with the following transformation. Consider the input rule (again given in a Prolog-style syntax):

p(X):-r(X), not (s(X)).

It is transformed into the following set of rules:

p(X,S,E):-r(X,Sp,Ep), pp5(X,Sp,Ep,S,E).
pp5(X,Sp,Ep,S,E):-s(X,S1,_), Sp<S1,
  S1<Ep, pp5(X,Sp,S1,S,E).
pp5(X,Sp,Ep,S,E):-s(X,_,E1), Sp<E1,
  E1<Ep, pp5(X,E1,Ep,S,E).
pp5(X,Sp,Ep,S,E):-not(wp6(X,Sp,Ep)).
wp6(X,S,E):-s(X,S1,E1), tInter(S1,E1,S,E).

The first rule looks for the temporal interval of the positive subgoal and uses a call to pp5 to get the pieces of that interval for which the negative subgoal does not hold. The nest two rules are used to gradually work through the interval until a part is discovered for which s (X) is not provable, which is finally decided upon with the fourth and fifth rule.

Rule Optimizations

Figure 12:
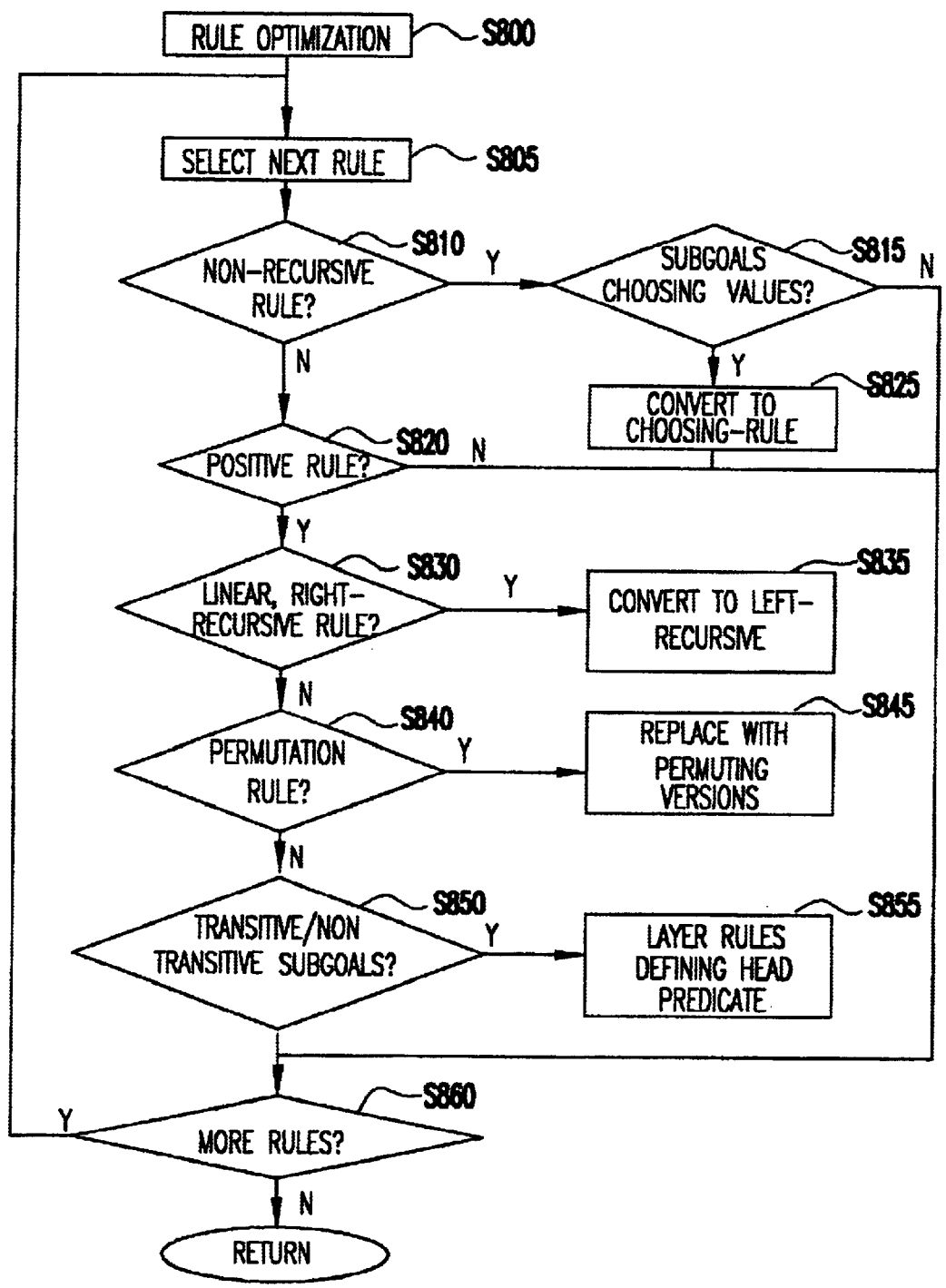
FIG. 12 is a flow diagram illustrating the logic of the process of rule optimization.

Non-recursive and recursive optimizations are shown in FIG. 12. Rule optimization is not taught by the prior art. Referring now to FIG. 12, a next rule is selected in step S805. If this is a non-recursive rule, as determined in step S810, then a determination is made in step S815 as to whether the target subgoals are selecting values with respect to combination rather than permutation, i.e., are the variable bindings significant with respect to order (permutation), or are redundant combinations unnecessary (combination). If combination is indicated, then the rule is converted to a choosing-rule rather that permutation.

If the rule was recursive, a determination is made in step S820 as to whether the rule is positive. If so, a determination is made in step S830 as to whether the rule is a linear, right recursive rule. If not, a determination is made in step S840 as to whether the rule is a permutation rule. If not, a determination is made in step S850 as to whether the rule has transitive and non-transitive subgoals. If so, then rules are layers defining head predicate in step S855. If the rule was a permutation rule, it is replaced with permuting versions in step S845. If the rule was a linear, right recursive rule, then it is converted to left recursive in step S835. If there are more rules, as determined by step S860, then processing continues at step S805. The difference in recursive and non-recursive rule processing is discussed further, below.

Non-recursive Optimizations (Part of Rule Optimization)

This step in the translation process is used to optimize the non-recursive rules. The only optimization performed is one that looks for subgoals designed for choosing from a set of values as opposed to running through the different permutations of those values. For example, the q subgoals in the following p(X,Y):-q(x,Z1), q(X,Z2), Z1\=Z2,
  r(Z1, Z2)

will bind (Z1, Z2) to the 2-permutation of all possible values, when all that is needed is the choose-2 values if r is symmetric. In this case, the rule would be optimized as follows:

p(X,Y):-choose(Z, q(X,Z), [Z1,Z2]),
  r(Z1,Z2).

where choose sets [Z1, Z2] to the choose-2 values determined by the bindings to z in the q (X, Z) call.

Positive-recursion Optimizations (Part of Rule Optimization)

Non-negative recursive rules are optimized in this step. The three optimizations currently applied are 1. Layering rules with a mix of transitive and non-transitive subgoals.
2. Replacing permutation rules with permuted duplicates.
3. Converting right-recursive calls to left-recursive.

The first optimization looks for rules of the form p(X,Y):-p(X,Z), q(Z,Y).

where q is transitive but p is not (order of the subgoals is not significant). In this case, the rule is converted to the equivalent pair p(X,Y):-pl(X,Z), q(Z,Y).
p(X,Y) pl(X,Z).

where all other p conclusions are converted to pi conclusions.

Permutation rules are ones that simply permute the arguments of the conclusion. The most common permutation rule is the one handling the symmetric nature of symmetric predicates. For example, let p be symmetric and let the rule set be the following p rules:

p(X,Y):-p(Y,X).
p(X, Y) q (X, Z), r (Z, Y)

This recursion can be eliminated by replacing these rules with p(X,Y) q(X,Z), r(Z,Y).
p(Y,X) q(X,Z), r(Z,Y).

This transformation can easily be generalized to arbitrary permutations.

Left-recursive calls are preferable to right-recursive calls in XSB (a Prolog-based logic programming system) because of the memoizing capability. This characteristic of XSB is discussed in K. F. Sagonas, T. Swift, and D. S. Warren, "An Abstract Machine for Computing the Well-Founded Semantics", *Proceedings of the Joint Conference and Symposium on Logic Programming*, September 1996, MIT Press: 274–288.

SCC (Strongly Connected Components) Review (not Shown)

Strongly connected components review is performed after rule optimization. Recursive components (recursive rule sets) are often the most costly to reason over. This stage of the translation process allows the user to review each component and attempt to manually break such recursions. It uses standard algorithms for identifying recursive components of the predicate dependency graph.

Memoizing Review

Memoizing (or tabling in the XSB vocabulary) previously computed answers to queries and sub-queries (subgoals) could benefit the overall efficiency of query processing. This stage of the translation allows the user to review the list of predicates and manually identify ones that should be memoized.

This review is followed by an analysis of the rule set that will memoize at least one call for each loop in the predicate dependency graph. This prevents infinite loops of the subgoal from occurring during query evaluation, and is accomplished by repeatedly searching for a loop in the dependency graph. Each time a loop is detected, a predicate is chosen (automatically) for memoizing and removed from (the working copy of) the graph.

Figure 13:
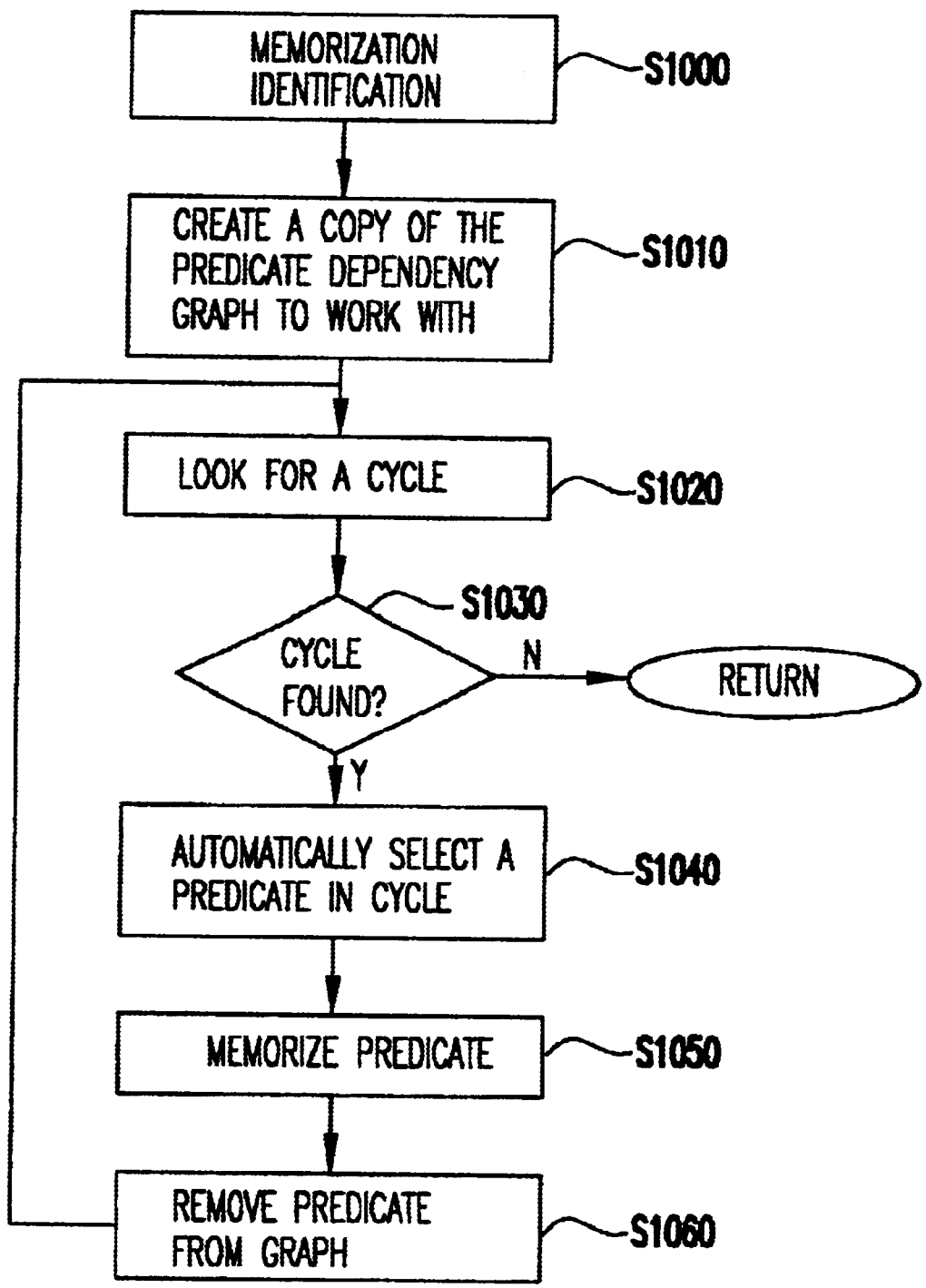
FIG. 13 is a flow diagram illustrating the logic of the process of memoization identification.

Referring now to FIG. 13, a process for memoization is shown. A copy of the predicate dependency graph to work with is created in step S1010. A cycle is sought in step S1020. If a cycle is found, as determined in step S1030, then a predicate in the cycle is automatically selected in step S1040. The predicate is memoized in step S1050 and then the predicate is removed from the graph step S1060. If there are no cycles, then the process returns.

Subgoal Reordering

The subgoals of a rule are ordered according to a cost model. This process is not shown in the prior art. The goal in the reordering is to make calls to minimize the overall cost of the rule according to the cost model. While most of this computation is a standard analysis of binding patterns, this model also makes an estimate of the cost of recursive components and attempts to sue that cost to weight recursive calls. This cost is estimated by taking the cost of the non-recursive rules concluding predicates in the recursive component and raising that to an exponent, which is a parameterizable setting.

Figure 14:
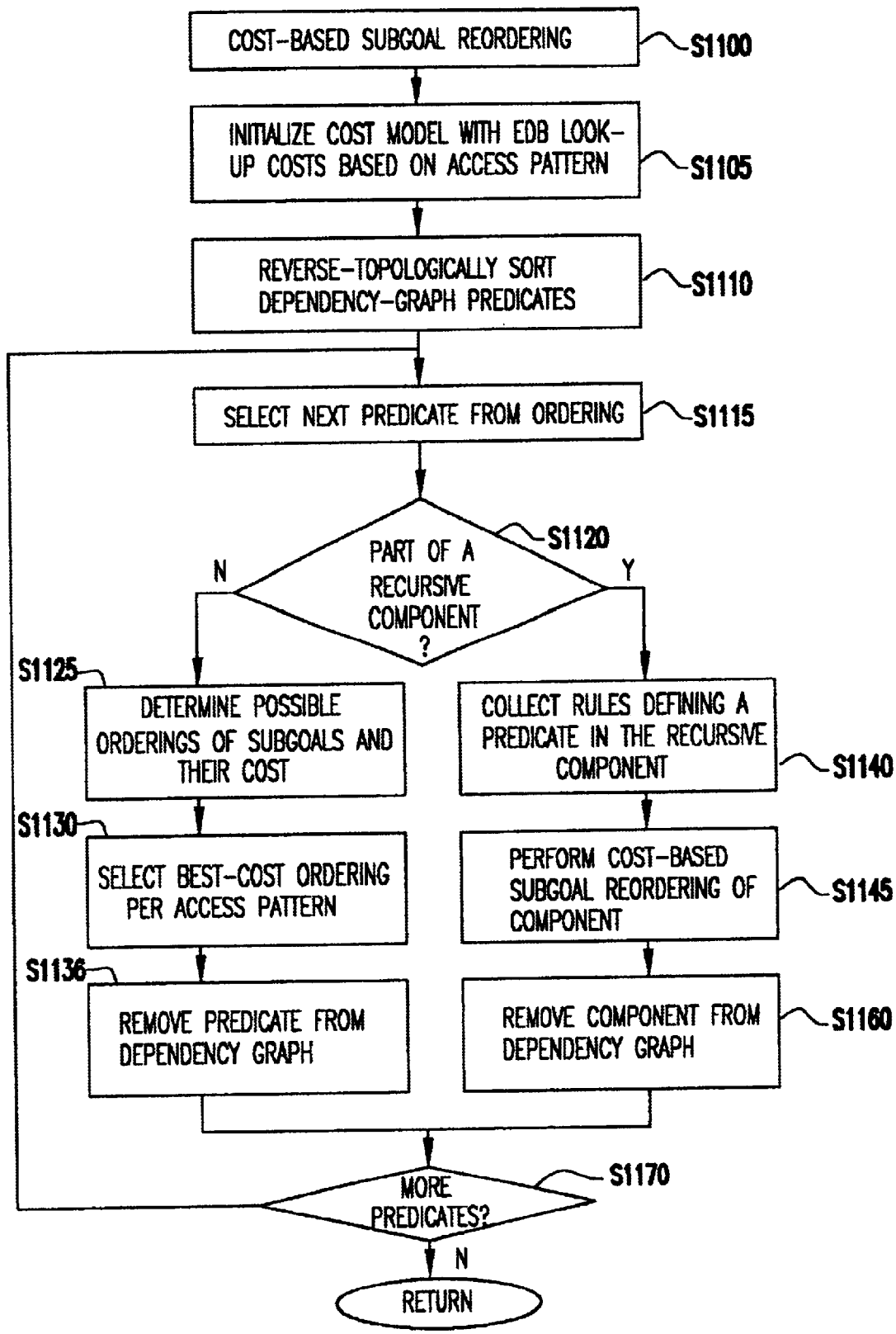
FIG. 14 is a flow diagram illustrating the logic of the process of cost-based subgoal reordering.

Referring now, to FIG. 14, there is shown a flow diagram for a cost-based subgoal reordering. A cost model is initialized with EDB look-up costs based on an access pattern in step S1105. Dependency-graph predicates are reverse-topologically sorted in step S1110. The next predicate is selected from ordering in step S1115. A determination is made as to whether the predicate is part of a recursive component in step S1120. If not, then possible orderings of subgoals and their cost are determined in step S1125. The best-cost ordering is then selected in step S1130. Finally, the predicate is removed from the dependency graph in step S1135.

If the predicate is part of a recursive component, then all rules defining a predicate in the recursive component are collected in step S1140. Cost-based subgoal reordering of the component is performed in step S1145. Then the component is removed from the dependency graph in step S1160. If there are more predicates, as determined in step S1170, then the process continues at step S1110; otherwise, it returns.

Figure 15:
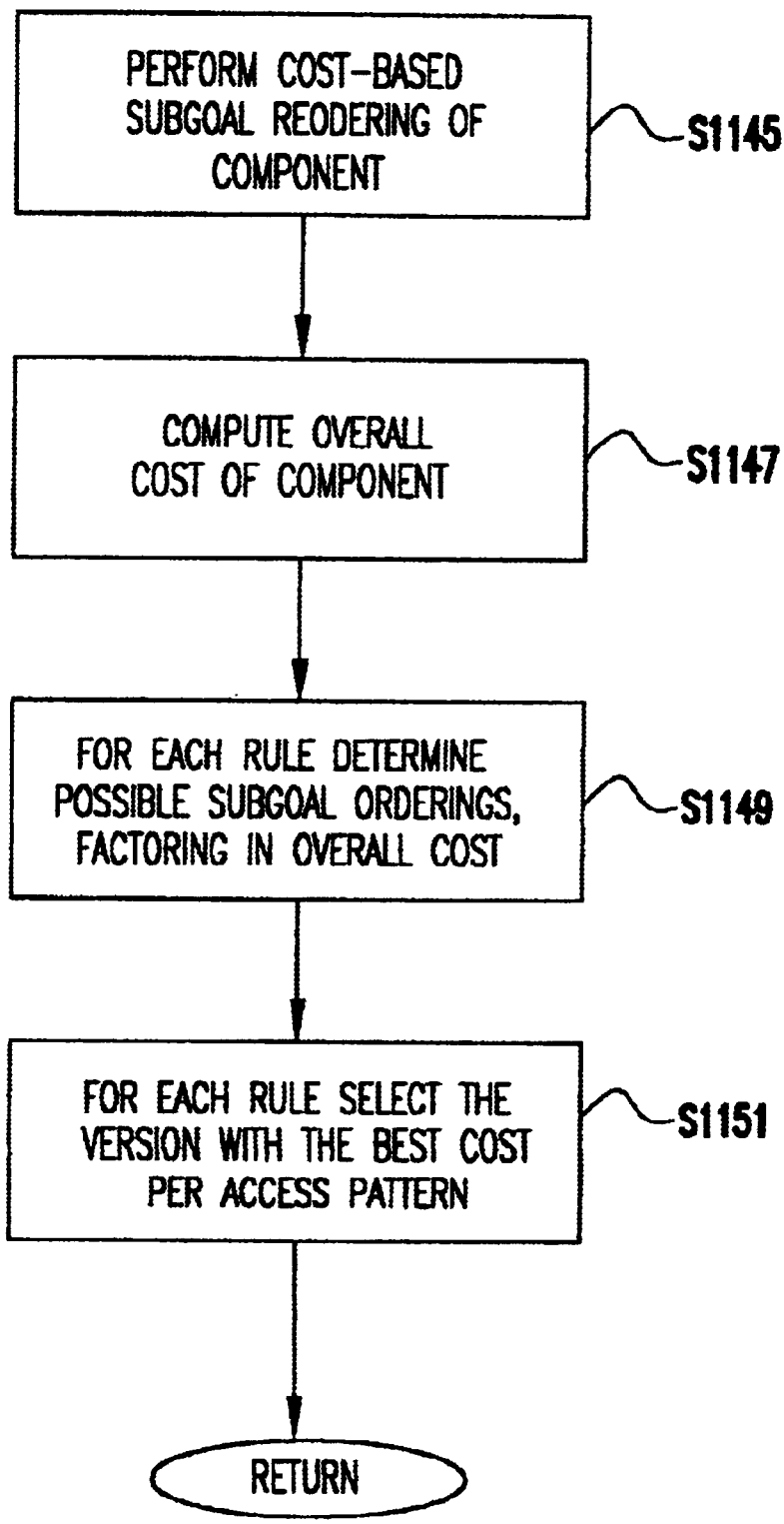
FIG. 15 is a flow diagram illustrating the logic of the process of estimating recursive-component cost.

Referring now to FIG. 15, step S1145 is further illustrated in a flow diagram for performing cost-based subgoal reordering of components. First, the overall cost of the component is computed in step S1147. For each rule, the possible subgoal orderings are determined, factoring in total cost, in step S1149. Finally, for each rule, the version with the best cost per access pattern is selected in step S1151.

A more detailed discussion of the cost-based model follows.

Cost Model on EDB

A cost model associated with the EDB. The figures in this model are used to estimate that number of answers for each binding pattern query to the EDB.

Estimation of Answers:

The first part of the cost model consists of two figures provided for every binding pattern combination (except all bound and all free) on each EDB predicate:

[Answer] assuming a success, the number of expected answers, and

[Chance] the chances of success.

For example, p__EDB/2:

bf: expect 5 answers for the free variable (on a successful value for the bound variable), but with only a 20% chance of success at all.

fb: expect 1 answer for the free variable, but with an 80% chance of success.

Failing Threshold and Failing IDB:

In general, it is best to fail as soon as possible, so the second figure in the EDB estimation of answers (the chance of success) will be used to identify calls for which it can be assumed will fail. This is important for subgoal reordering since it will be used to override the ordering determined by other cost estimation. For example, it is better to repeat a tabled call, as in a(X,Y):–a(X,Z), q(X,Z), p(Z,Y).

However, if q/bf is a failing call, then the preferred ordering may be a(X,Y):–q(X,Z), a(X,Z), p(Z,Y).

Even though such an ordering will not repeat the tabled call, it would be best to avoid the recursion altogether by failing first. Failing subgoals should be used as soon as then can within a rule body. One should note that an IDB is failing if every proof branch is failing. Instead of using that to identify failing IDB, it is preferred to just zero out the answers cost of a failing EDB. This way, a failing IDB will have its cost as the size of its search tree without the EDB leaves.

Proof Cost Estimation:

Estimating the size of a proof tree provides an estimation of the cost of proving a query for all answers. In the non-recursive case, this is going to be a conservative estimation, computing the maximum size of the tree used to find all answers assuming the Answer figure in the EDB cost model. The recursive case does not easily lend itself to ensuring a conservative estimate, since the recursion is dependent on the data itself more so than the size of the EDB. It would be possible to use the size of the EDB to derive an upper bound on the size of the active domain and so an upper bound on the size of the recursive relation, but this is not done in this cost estimation.

Non-Recursive Case:

This case is pretty straight-forward, essentially one just computes the cost of each subgoal and multiply them together. This represents the size of the proof tree required to compute all answers to a call. Each answer to one subgoal provides a choice (or backtracking option) for the subgoal after it.

The following is the formula used:

$$\mathrm{cost}(p) = n + \sum_{ru} \prod_{sg} \mathrm{cost}(sg)$$

where 1. n is the number of rules with head p if p is a non-EDB predicate; otherwise, it is the Answers figure in the cost model. [Reference following sections for discussion of matching heads.]

2.

$$\sum_{ru}$$

is the summation over the rules for p,

3.

$$\prod_{sg}$$

is the product over the subgoals per rule.

Recursive Case:

Rather than have a cost for each query in a recursive component, this gives a cost to the component itself. First, this presents the cost estimation representing the estimated size of the proof tree to compute all answers to a recursive call. After giving the formula, an example, and a couple of justifications, the cost of the number of tables used is considered.

The following is the formula used for these cases:

$$\text{cost}(rc(p)) = \left( \sum_{rsg \in rc} nr(rsg) \right) \left[ \prod_{rsg \in rc} \sum_{ru \in rsg} \prod_{sg \in ru} nrsg(sg) \right]^x$$

where 1. rc(p) is the recursive component that p belongs to.
2.

$$\sum_{rsg \in rc} nr(rsg)$$

is the summation of the cost of the non-recursive rules for each of the calls used in the recursive component.

3.

$$\prod_{rsg \in rc}$$

is a product over all subgoal calls rsg used in the recursive component rc.

4.

$$\sum_{ru \in rsg}$$

is a summation over all rules ru concluding the target subgoal call rsg.

5.

$$\prod_{sg \in ru}$$

is a product over all subgoals per rule ru.

6. nrsg(sg) is the cost of the non-recursive subgoal sg in the particular rule ru. Returns I for recursive subgoals, and cost(sg) otherwise.
7. The exponent X indicates exponentiation to an arbitrary value. This represents the largest number of recursive loops taken in the proof.

Note that if a recursive rule has a failing subgoal call, then the cost for that rule becomes 0. If this is the case, then that subgoal should be placed first. The arbitrary integer X is intended to indicate that the recursion cycles over and over. How many times is dependent on the data. It is up to the user to indicate what figure to use.

Number of Tables Required:

It is best if, in XSB, tabled calls are repeated, meaning that the calls are variants of each other. For rules that are immediately recursive, this can be easily guaranteed by ordering the subgoals so that a recursive call is a variant of the head (and its particular binding pattern); however, this is much harder for larger recursive components.

In the general case (recursive components larger than I), there could be a preference for a standard binding pattern for recursive calls.

Matching Rule Heads:

Both the recursive and non-recursive cost estimations have to recognize when a rule head is an applicable match to a call. This question is complicated by the explicit presence of terms within the mode of a rule head and subgoal. For example, the head p (X, dog) will never match the call p (Y, cat), so even if they each may have the same pattern of bound/ground/free patterns, the explicit term prevents any matches. What's more, if a p/2 call has the mode [G, F] {meaning a ground/free call), there is a reasonable chance that such a call will not match all of the following rule heads (no matter the mode requirement on the $2^{nd}$ position):

p(dog, Y):– . . .
p(cat, Y):– . . .
p(bat, Y):– . . .

The ground argument (or even bound) can't match dog, cat, and bat.

Cost With No Terms in Head:

When there aren't any explicit (non-variable) terms in a rule head, then there aren't any complications in matching (the rule just has to have a subsuming mode). In this case, the cost of a call will include all the rules with a subsuming head.

Cost With Terms in Head:

When there are explicit (non-variable) terms in the head, then determining relevant rules becomes more complicated. If the terms are ignored, then that could penalize rules that have non-variable arguments in their head, which is counter to the actual benefit.

One possible way of taking these rule heads into account is to assume that a call with a bound argument will match only one of these rule head (non-variable) terms. For example, with the rules $$p(-, \ dog, \ ?) \quad :-\ldots \quad \{\text{cost } 1\}$$
$$p(-, \ cat, \ ?) \quad :-\ldots \quad \{\text{cost } 2\}$$
$$p(-, \ cat, \ dog) \quad :-\ldots \quad \{\text{cost } 4\}$$
$$p(-, \ ?, \ bat) \quad :-\ldots \quad \{\text{cost } 8\}$$

the call p(-, +, +)

(free, bound, bound call) would cost 10. This was computed by allowing the call to match the most expensive of the possible rule heads (the $2^{nd}$ and $4^{th}$). This would be accomplished by assuming that the bound arguments in the call were the constants from the most expansive (otherwise matching) rules. So the $2^{nd}$ argument gets cat, and the $3^{rd}$ bat.

Converting Recursive Cost to Logarithms:

In the preferred embodiment, costs are actually stored as logarithms. This means that the formulas can be simplified accordingly.

Non-Deductive Database Generation

In an alternative embodiment, if the database to be generated is a relational database, then the following steps are performed.

Make Ordinary/non-ordinary Distinction

Figure 16:
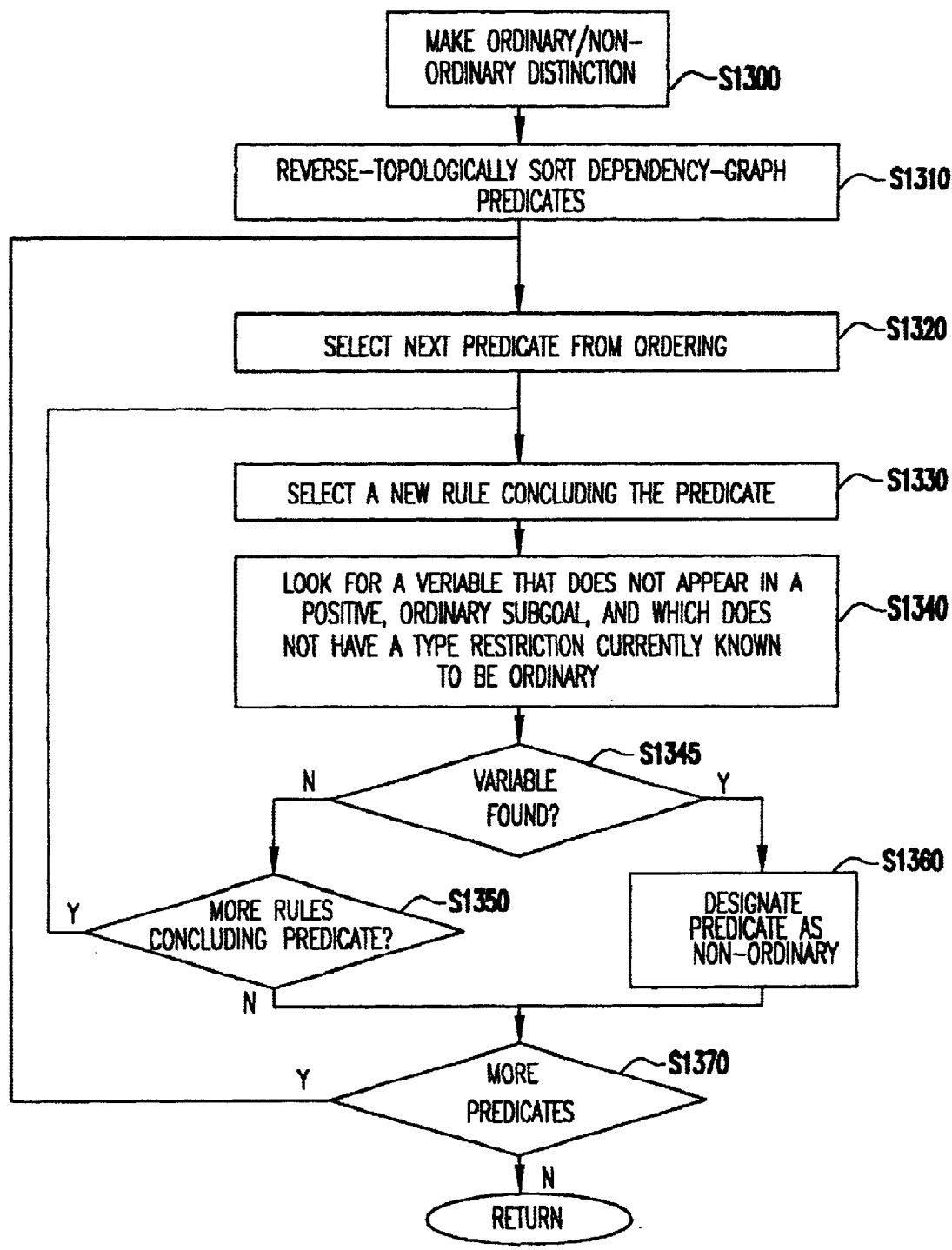
FIG. 16 is a flow diagram illustrating the logic of the process of distinguishing ordinary and non-ordinary predicates.

Referring now to FIG. 16, a dependency-graph predicates are reverse-topologically sorted in step S1310. The next predicate is selected from ordering, in step S1320. A new rule concluding the predicate is selected in step S1330. A search for a variable that does not appear in a positive, ordinary subgoal, and which does not have a type restriction currently known to be ordinary is performed in step S1340. A determination is then made as to whether a variable was found during the search in step S1345. If not, the predicate is designated as non-ordinary in step S1360. If so, then a determination is made as to whether there are more rules concluding the predicate in step S1350. If so, processing continues with step S1 330. When processing of a predicate is complete, a determination is made as to whether there are more predicates to be processed in step S1370. If so, processing continues with step S1320.

Generate type-table Definitions

Figure 17:
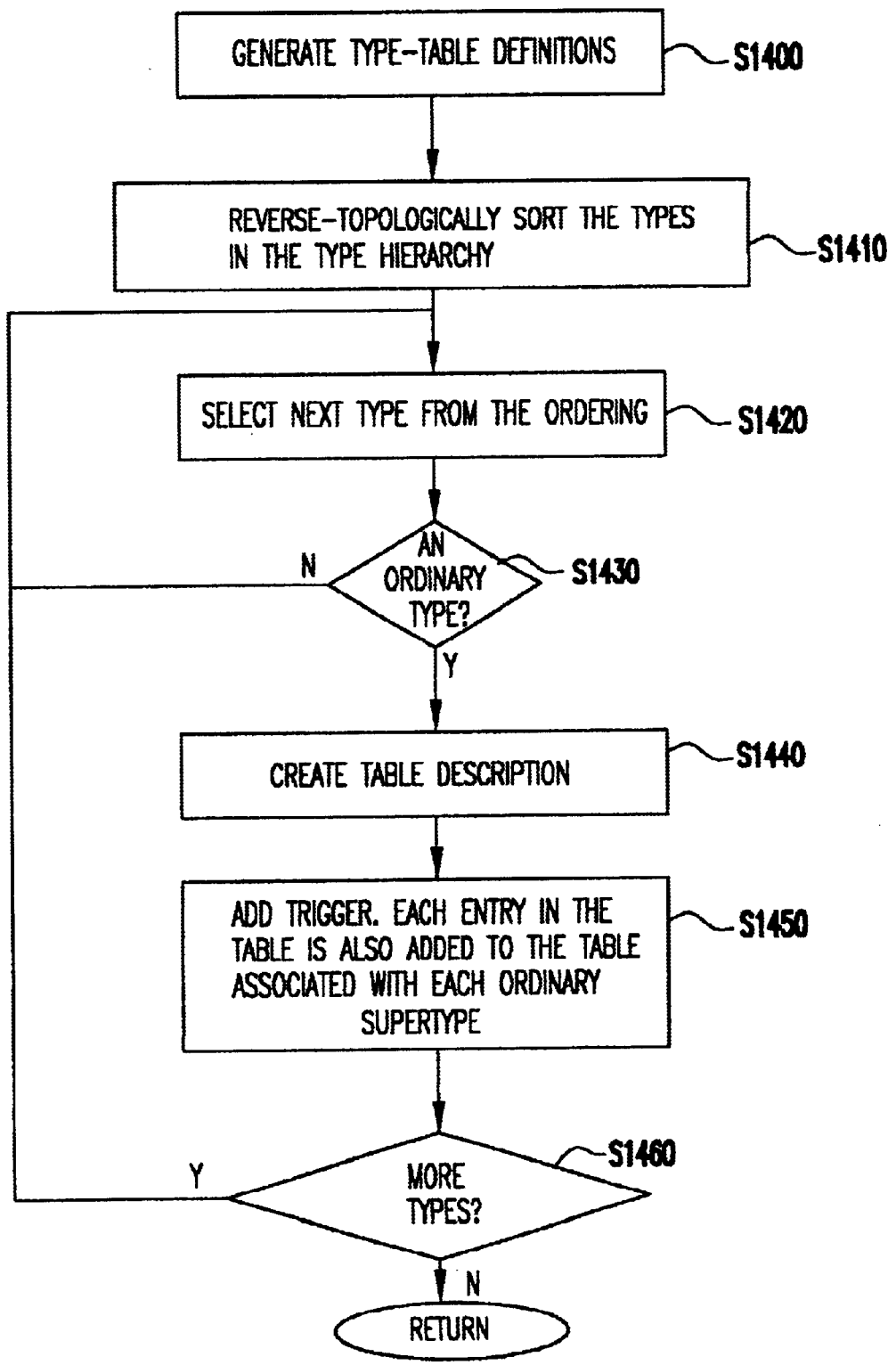
FIG. 17 is a flow diagram illustrating the logic of the process of generating type tables.

Referring to FIG. 17, there is shown a process for generating type-table definitions. A reverse-topological sort is performed on the types in the hierarchy in step S1410. The next type is then selected from the ordering in step S1420. A determination is made as to whether the type is ordinary in step S1430. If not, then processing continues with the next type in the ordering at step S1420. Otherwise, a table description is created in step S1440. A trigger is added to each new entry in the table, where the new entry is associated with each ordinary super type, in step S1450. A determination is made as to whether there are more types in step S1460, and if so, processing continues with step S1420.

Generate EDB-table Definitions

Figure 18:
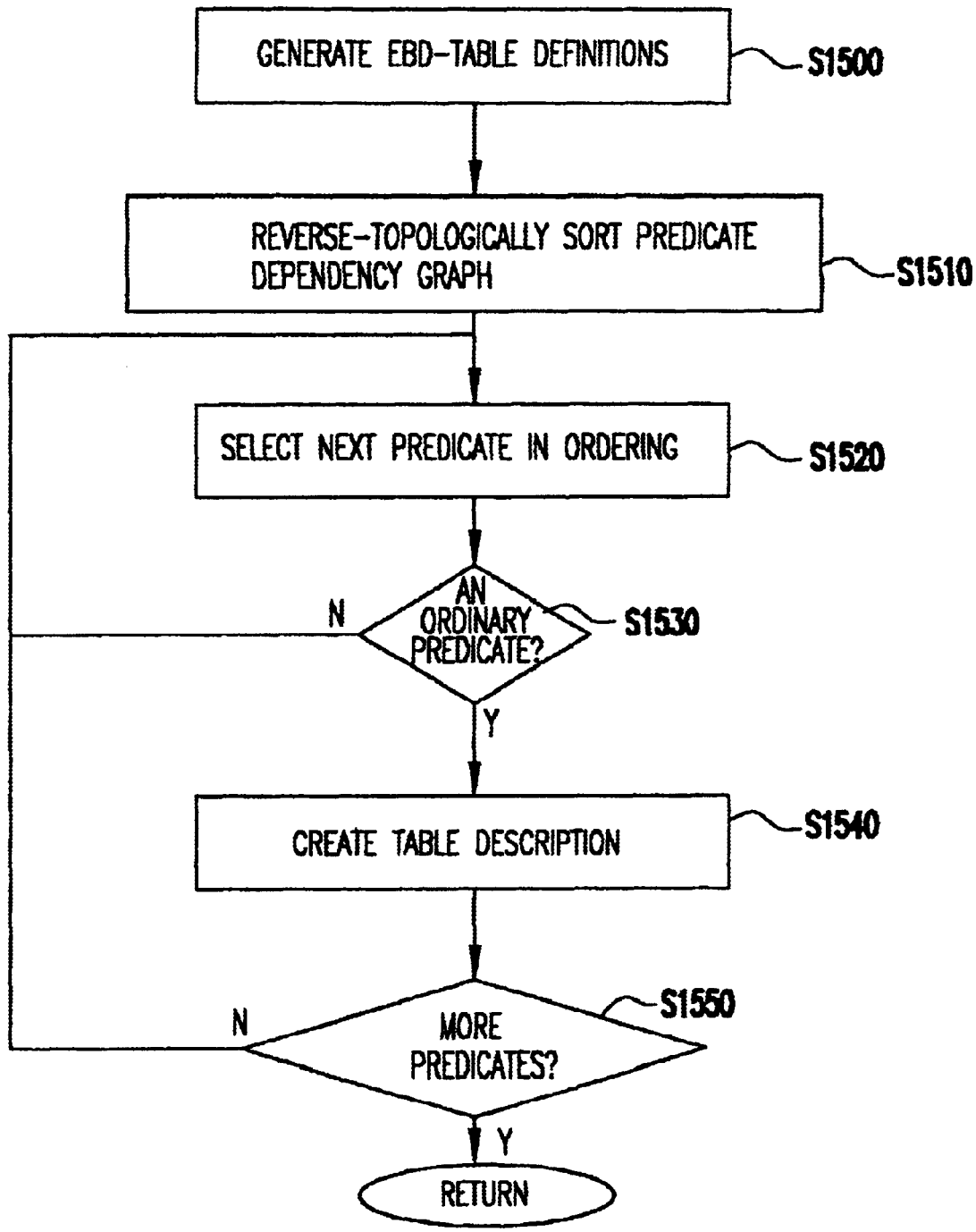
FIG. 18 is a flow diagram illustrating the logic of the process of generating base tables.

Referring to FIG. 18, there is shown a process for generating EDB-table definitions. A reverse-topological sort is performed on the predicate dependency graph in step S1510. The next predicate is then selected from the ordering in step S1520. A determination is made as to whether the predicate is ordinary in step S1530. If not, then processing continues with the next predicate in the ordering at step SI1520. Otherwise, a table description is created in step S1540. A determination is made as to whether there are more predicates in step S1450, and if so, processing continues with step S1520.

Generate View Definitions

Figure 19:
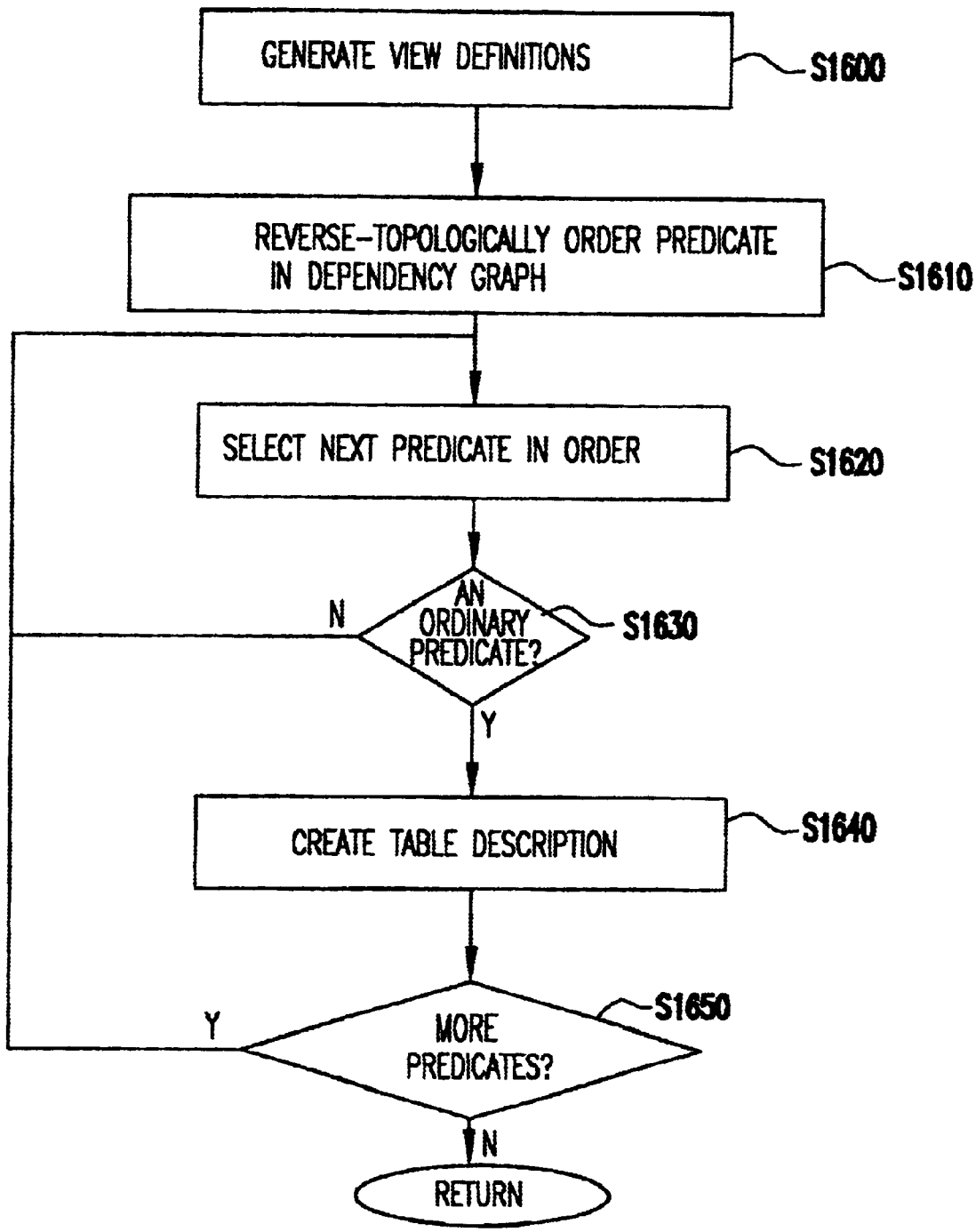
FIG. 19 is a flow diagram illustrating the logic of the process of generating view definitions.

Referring to FIG. 19, there is shown a process for generating view definitions. A reverse-topological ordering is performed on the predicate dependency graph in step S1610. The next predicate in the order is then selected in step S1620. A determination is made as to whether the predicate is ordinary in step S1630. If not, then processing continues with the next predicate in the order at step S1620. Otherwise, a table description is created in step S1640. A determination is made as to whether there are more predicates in step S1650, and if so, processing continues with step S1620.

Referring again to FIG. 1, for DDB's, the Pre-DBB 13 is a set of files giving the type hierarchy, predicate signatures, rule definitions, and integrity constraints generated by the DDBG 12. These files serve the same purpose of data-definition expressions 13B for relational database (RDB) systems. Because the DDB is based on XSB, these files are written in the XSB language. The Strongly-Typed API Generator (STAG) 14, described further below, takes the DBG output 13 and generates a Java-based API 15 for the resulting DB. This API 15 is a strongly typed, object-oriented view of the elements defined in the pre-DDB 13A (or pre-RDB 13B). In the case of a DDB, when the pre-DDB has a type T, a Java interface is generated with name T and method descriptions corresponding to the predicates that use T in their signature. A Java class file is generated which gives the definition of the T interface, handling communication with the corresponding DDB. This API is very similar to the one described in Peterson et al.

Figure 20:
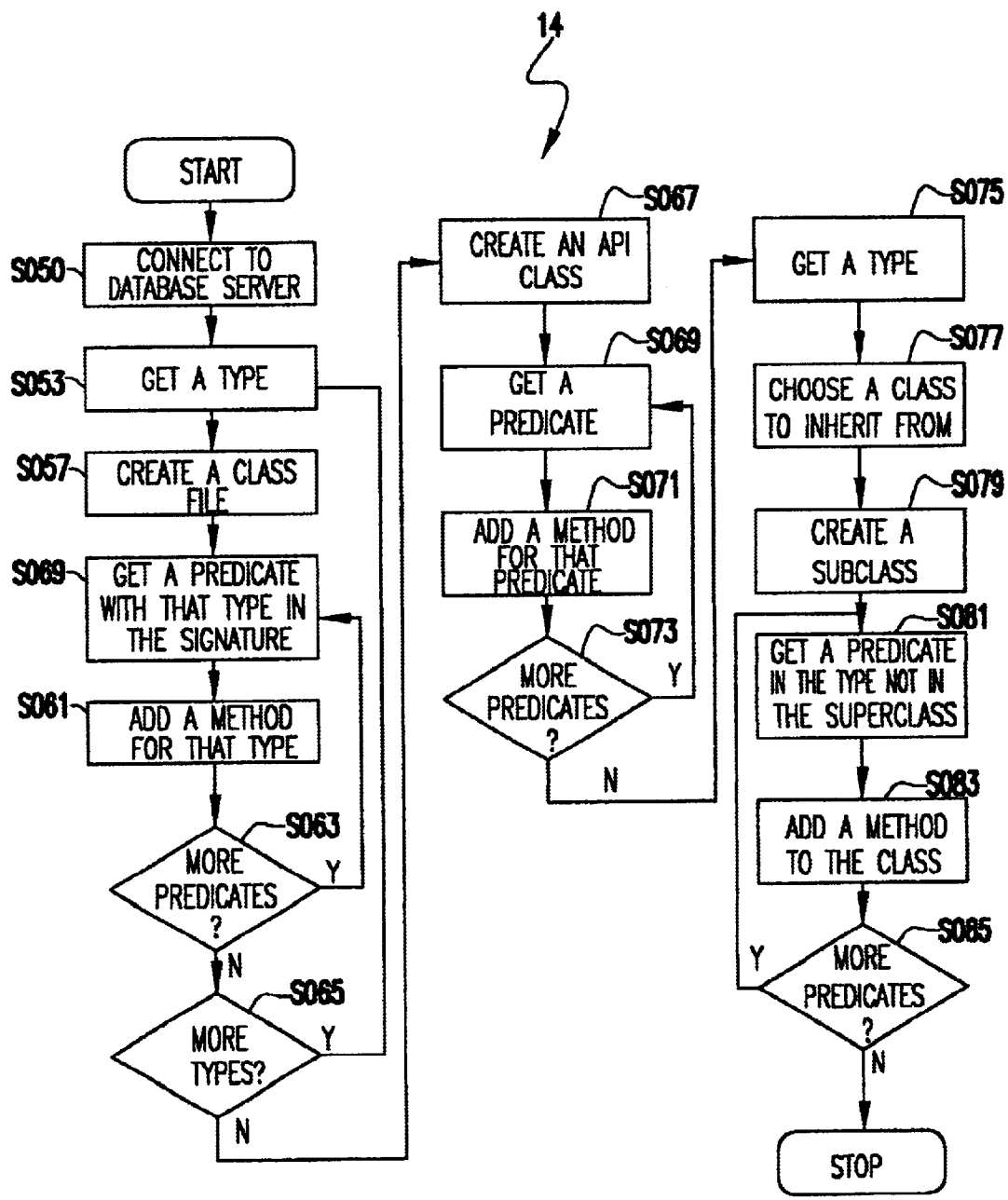
FIG. 20 is a flow diagram illustrating the logic of the STAG.

Referring now, to FIG. 20, the process for generating an API for the selected database is shown. First, a connection to the database server is made in step S050. A type is selected in step S053. A class file is created for the selected type in step S057. A predicate in the signature of that selected type is then selected in step S059. A method is then added for that type in step S061. A determination is made as to whether there are more predicates in step S063. If so, then the next predicate in the signature of that selected type is then selected in step S059. If not, then a determination is made as to whether there are more types in step S065. If so, then processing continues with the next type in step S054. Otherwise, when all types have been processed, class for the API is created in step S067.

A predicate is selected in step S069. A method is added for the predicate in step S071. A determination is made as to whether there are more predicates in step S073. If so, then the next predicate is selected in step S069. If not, then a type is selected in step S075. A class is chosen from which to inherit in step S079. A subclass is creates in step S079. A predicate is selected in the type not in the superclass in step S081. A method is added to the class in step S083. A determination is made as to whether there are more predicates in step S085. If so, then processing continues with the next predicate in step S081. Otherwise, processing is complete.

The API has not been generated to interact with the target database (RDBMS17 or DDB 16). In one embodiment, the deductive database (DDB) 16 consists of a pre-DDB 16A with a Java server 16B and a backing store 16C. In the preferred embodiment, the Java server 16B is written in Ontology Works language (OWL) to manage transactions and multi-users to the XSB engine (running the pre-DBB 16A), as well as to handle communication with the backing store 16C. The Ontology Management System (OMS) 11 is used to manage, maintain, and create a OWL-based ontology. The process of adding OWL into an OMS-ontology is based on the DBG process. In effect, the OMS is a DBB very similar to one generated by the DBG 12; the difference is that the OMS11 cannot perform many of the optimizations that the DDBG 12 can.

Specifically, the Ontology Management System (OMS) is essentially a KBDB that utilizes a restricted form of the DDBG to convert input OWL into the XSB-implementation forms. This OMS-generator version of the DDBG, the OMSG, performs many of the same translations that the DDBG does, but cannot perform operations that assume a fixed set of predicates and rules. It also does not do anything to break cycles in the dependency graph; instead, it translates according to the WFS and not a restricted semantics. The following are the OMSG steps which are a variation on the DDBG steps described in FIG. 4.

1. Skolem-term conversion: the same as for the DDBG.
2. CNF-to-rules conversion: essentially the same as for the DDBG, though many heuristics for identifying integrity constraints may not be applicable.
3. Extensional database (EDB) conversion: the same as for the DDBG.
4. Equality reasoning: the same as for the DDBG.
5. Fill type-checking gaps: the same as for the DDBG.
6. Assertion identifier (AID) addition: the same as for the DDBG.

7. Temporal conversion: the same as for the DDBG, though it uses the WFS-compliant conversion.
8. Non-recursive optimization: performs any optimizations possible that do not require the assumption that the rule and predicate set is fixed.
9. Positive-recursion optimization: performs any optimizations possible that do not require the assumption that the rule and predicate set is fixed.
10. Subgoal reordering: essentially the same as for the DDBG, though the base-cases for the cost model are based on less-accurate estimations.

While the invention has been described in terms of its preferred embodiments, those skilled in the art will recognize that the invention can be practiced with modification within the spirit and scope of the appended claims.

Having thus described our invention, what we claim as new and desire to secure by letters patent is as follows:

1. A computer implemented integrated ontology development environment (IODE) for generating database schemas, definitions, tables and corresponding rules sets and integrity constraints from an ontology for a selected common domain and for generating application program interface (API) specifications for at least one target domain within the common domain, comprising:

an ontology management system (OMS) containing a formal representation of at least one ontology for a target subject domain and corresponding parent or ancestral domains, the parent domains being shared by one or more target subject domains, wherein the ontology is defined with a number of explicit integrity constraints;

a database generator (DBG), the DBG enabling generation of output, the output customized to a type of database, wherein the database is defined-by the target subject domain ontology; and a strongly typed API generator (STAG) generating an Qbject-oriented API for use in programming an application using the target subject domain ontology and corresponding parent or ancestral ontologies to access and use data in a database generated by the DBG, wherein the API maintains integrity of the generated database using the explicit and implicit integrity constraints defined by the hierarchy of ontologies, wherein the automatic generation of a database by the DBG performs rule optimization, and the DBG has an alternate temporal transformation that allows for both stratified and non-stratified rules.

2. A computer implemented (IODE), as recited in claim 1, wherein the DBG generates a database of the type of one of a deductive database, a relational database and an object-oriented database.

3. A computer implemented integrated ontology development environment (IODE) as recited in claim 1, wherein the at least one ontology (i) uses well founded semantics, (ii) takes advantage of unary type-checking predicates for better predicate dependency analysis, and (iii) differentiates between predicates that are time dependent and those predicates that are not time dependent.

4. A computer implemented integrated ontology development environment (IODE) as recited in claim 3, wherein the at least one ontology further uses a specialized type hierarchy to restrict a notion of a type in order to better correlate specification and generation of databases.

5. A computer implemented integrated ontology development environment (IODE) as recited in claim 3, wherein a temporal model is correct with respect to the well founded semantics.

6. A computer implemented integrated ontology development environment (IODE) as recited in claim 3, wherein the OMS creates transform rules to have a well founded semantics temporal model.

7. A computer implemented integrated ontology development environment (IODE) as recited in claim 3, wherein the DBG creates transform rules to have a well founded semantics temporal model.

8. A computer implemented integrated ontology development environment (IODE) as recited in claim 1, wherein the OMS conducts equality reasoning on the at least one ontology and the database generated by the DBG has characteristics allowing equality reasoning to be performed on the database.

9. A computer implemented integrated ontology development environment (IODE) as recited in claim 1, wherein the OMS recognizes predicates for definitional rules, integrity constraints, fixed extents, and transitive closure in the at least one ontology.

10. A method for generating a database and corresponding API from an ontology for a selected common domain for at least one target domain within the common domain, said method comprising the steps of:

loading conjunctive normal form (CNF) data into a database generator;

handling existential quantification on the CNF data;

converting the CNF data to rules;

reformulating the rules for performing equality reasoning;

breaking negative cycles for deductive databases, and breaking all cycles for relational and object-oriented databases;

generating a database specification for the database from the reformulated rules and integrity constraints; and generating an API corresponding to the generated database.

11. The method as recited in claim 10, wherein a deductive database is generated in the generating step, the generating step further comprising the steps of one or a combination of:

temporalizing the reformulated rules;

optimizing the reformulated rules;

performing memoization identification on the reformulated rules; and performing cost-based subgoal reordering on the reformulated rules in cost estimation.

12. The method as recited in claim 11, wherein the optimizing rules step further comprises the steps of:

(1) layering rules with a mix of transitive and non-transitive subgoals;

(2) replacing permutation rules with permuted duplicates; and (3) converting right-recursive calls to left-recursive calls.

13. The method as recited in claim 12, further comprising the step of:

identifying subgoals designed for choosing from a set of values instead of running through permutations of those values.

14. The method as recited in claim 11, further comprising the step of:

identifying subgoals designed for choosing from a set of values instead of running through permutations of those values.

15. The method as recited in claim 11, wherein the cost-based subgoal reordering step accommodates both non-recursive rule sets and recursive rule sets, thereby enabling a reliable and repeatable generation process, and decreases time required to generate a usable database.

16. The method as recited in claim 15, wherein the step of subgoal reordering further comprises the steps of:
   estimating answers;
   identifying failing threshold and failing IDB (intensional database); and
   performing proof cost estimation.

17. The method as recited in claim 16, wherein the step of proof cost estimation utilizes recursive case, non-recursive cases and a number of tables required.

18. The method as recited in claim 10, wherein a relational database is generated in the generating step, the generating step further comprising the steps of:
   distinguishing between ordinary and non-ordinary predicates;
   generating type-table definitions;
   generating EDB-table definitions; and generating view definitions.

19. The method as recited in claim 10, wherein existential quantification is handled in the handling step using skolem-term conversion.

20. The method as recited in claim 19, wherein the CNF converting step uses automatic decision making routines to decide if a particular rule version is desirable or not, and further comprises the step of:
   determining whether (i) a version of the rule concludes a predicate added from the skolem-term conversion, (ii) a version of the rule flounders, allowing for arbitrary ordering of subgoals, (iii) a version of the rule concludes a predicate with a selected ontology type, and (iv) a version of the rule concludes a predicate that has a "def" assertion, but an originating input sequence is not considered definitional according to an interpretation of the "def" assertions.

21. The method as recited in claim 10, wherein the step of performing equality reasoning further comprises the steps of:
   modifying fact-base calls to forward compute and maintain equality and canonical relationships;
   adding reflexive-case rules for equality reasoning;
   determining whether a rule is an EDB (Extensional Database) store rule, and if so then adding look-ups and adding canonical-reference tests; and
   if necessary, determining whether the rule is an EDB-store fact, and if so then rectifying the rule.

22. A computer implemented integrated ontology development environment (IODE) for generating database schemas, definitions, tables and corresponding rules sets and integrity constraints from an ontology for a selected common domain and for generating application program interface (API) specifications for at least one target domain within the common domain, comprising:
   an ontology management system (OMS) containing a formal representation of at least one ontology for a target subject domain and corresponding parent or ancestral domains, the parent domains being shared by one or more target subject domains, wherein the ontology is defined with a number of explicit integrity constraints;
   a database generator (DBG), the DBG enabling generation of output, the output customized to a type of database, wherein the database is defined by the target subject domain ontology; and
   a strongly typed API generator (STAG) generating an object-oriented API for use in prowramming an application using the target subject domain ontology and corresponding parent or ancestral ontologies to access and use data in a database generated by the DBG, wherein the API maintains integrity of the generated database using the explicit integrity constraints defined by the hierarchy of ontologies,
   wherein the automatic generation of a database by the DBG performs rule optimization, and the DBG has an alternate temporal transformation that allows for both stratified and non-stratified rules and the generated API does not allow dynamic class creation.

23. A computer implemented integrated ontology development environment (IODE), comprising:
   an ontology management system (OMS) containing a formal representation of at least one ontology defined with a number of explicit integrity constraints having a target subject domain and corresponding parent or ancestral domains;
   a database generator (DBG) enabling generation of output customized to a type of database defined by the target subject domain ontology; and
   a strongly typed API generator (STAG) generating an object-oriented API for use in programming an application using the target subject domain ontology and corresponding parent or ancestral ontologies to access and use data in a database generated by the DBG,
   wherein the API is configured to ensure that the explicit integrity constraints are checked when the database is modified.

24. The IODE of claim 23, wherein the OMS provides for transformation of non-stratified rules.

25. A method for generating a database and corresponding API from an ontology for a selected common domain for at least one target domain within the common domain, said method comprising the steps of:
   loading ontology into a database generator, the ontology being defined by sentences provided in conjunctive normal form (CNF), the sentences being defined by at least one of a set of rules and explicit integrity constraints;
   converting the CNF sentences into at least one of an executable set of rules and explicit integrity constraints;
   reformulating the at least one of the executable set of rules and explicit integrity constraints in order to generate a database specification for the database; and
   generating an API corresponding to the generated database.

26. The method of claim 25, further comprising the step of reformulating the at least one of the executable set of rules and explicit integrity constraints in order to enable equality reasoning.

27. The method of claim 25, further comprising the steps of: analyzing the reformulated executable set of rules to identify cycles; and
   breaking the cycles in the database such that negative cycles are broken for generating a stratified deductive data base and all cycles are broken for generating a relational database or an object oriented database,
   wherein, optionally, no cycles are broken in order to generate a non-stratified database.

* * * * *

UNITED STATES PATENT AND TRADEMARK OFFICE
CERTIFICATE OF CORRECTION

PATENT NO.    : 6,640,231 B1
DATED         : October 28, 2003
INVENTOR(S)   : William A. Andersen et al.

It is certified that error appears in the above-identified patent and that said Letters Patent is hereby corrected as shown below:

Column 27,
Line 37, change "Qbject" to -- object --.

Column 30,
Line 2, change "prowramming" to -- programming --.

Signed and Sealed this

Ninth Day of December, 2003

JAMES E. ROGAN
*Director of the United States Patent and Trademark Office*